(12) United States Patent
Meredith et al.

(10) Patent No.: US 10,012,719 B2
(45) Date of Patent: Jul. 3, 2018

(54) E911 LOCATING BY NEARBY PROXY DEVICE LOCATION

(71) Applicants: AT&T Mobility II LLC, Atlanta, GA (US); AT&T Intellectual Property I, L.P., Atlanta, GA (US)

(72) Inventors: Sheldon Kent Meredith, Roswell, GA (US); Brandon B. Hilliard, Woodstock, GA (US); William Cottrill, Canton, GA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 39 days.

(21) Appl. No.: 14/814,845

(22) Filed: Jul. 31, 2015

(65) Prior Publication Data

US 2017/0030994 A1 Feb. 2, 2017

(51) Int. Cl.
*G01S 5/02* (2010.01)
*H04W 4/02* (2018.01)
*G01S 5/00* (2006.01)

(52) U.S. Cl.
CPC .......... *G01S 5/0231* (2013.01); *G01S 5/0027* (2013.01)

(58) Field of Classification Search
CPC ...... G01S 5/0231; G01S 5/0027; H04W 4/22; H04W 76/007; H04W 92/10; H04W 88/00; H04W 88/02; H04W 4/02; H04W 64/00; H04L 29/08657; G08B 25/016
USPC .............. 455/404.1–404.2, 456.1–457, 41.2, 455/518–519
See application file for complete search history.

(56) References Cited

U.S. PATENT DOCUMENTS

| | | | |
|---|---|---|---|
| 6,236,365 B1 * | 5/2001 | LeBlanc | G01C 21/206 342/450 |
| 6,901,260 B1 | 5/2005 | Xin | |
| 7,818,017 B2 | 10/2010 | Alizadeh-Shabdiz et al. | |
| 7,864,048 B1 | 1/2011 | Cope et al. | |
| 7,937,067 B2 | 5/2011 | Maier et al. | |
| 8,290,470 B2 | 10/2012 | Ray et al. | |
| 8,483,705 B1 | 7/2013 | Cope et al. | |
| 8,521,124 B2 | 8/2013 | Kamdar | |
| 8,543,083 B2 | 9/2013 | Holland et al. | |
| 8,634,847 B2 | 1/2014 | Edwards et al. | |
| 2007/0287473 A1 * | 12/2007 | Dupray | H04W 4/02 455/456.1 |
| 2008/0188243 A1 | 8/2008 | Giustina et al. | |
| 2008/0214142 A1 * | 9/2008 | Morin | G08B 25/016 455/404.2 |

(Continued)

FOREIGN PATENT DOCUMENTS

EP 2320685 A1 5/2011

*Primary Examiner* — Sharad Rampuria
(74) *Attorney, Agent, or Firm* — Baker & Hostetler LLP

(57) ABSTRACT

A method for determining the location of a mobile device that has placed an emergency call includes determining that an emergency call has been made by a mobile device having a wireless radio and receiving, from the mobile device, an identifier of a first device detected by the wireless radio. If the first device is not fixed, the method includes sending a first location request to the first device to determine a first location of the first device. The method also includes determining a location of the mobile device based upon the first location and providing the mobile device location to a recipient of the emergency call.

19 Claims, 13 Drawing Sheets

(56) References Cited

U.S. PATENT DOCUMENTS

| | | | |
|---|---|---|---|
| 2011/0111726 A1* | 5/2011 | Kholaif | G01S 1/68 |
| | | | 455/404.2 |
| 2011/0130146 A1 | 7/2011 | Liu et al. | |
| 2012/0088468 A1 | 4/2012 | Dickinson et al. | |
| 2013/0045759 A1* | 2/2013 | Smith | H04W 64/00 |
| | | | 455/456.6 |
| 2013/0217355 A1 | 8/2013 | Ray et al. | |
| 2015/0163642 A1* | 6/2015 | Bates | H04W 4/043 |
| | | | 455/404.2 |
| 2016/0077186 A1* | 3/2016 | Snapp | G01S 5/0231 |
| | | | 455/404.2 |

\* cited by examiner

E911 LOCATING BY NEARBY PROXY DEVICE LOCATION

TECHNICAL FIELD

The technical field generally relates to public safety and, more specifically, to systems and methods for determining the location of an emergency caller.

BACKGROUND

In certain emergency call systems, such as Enhanced 911 (E911), methods may be used to automatically associate a location with the caller. This location may be a street address or other geographic location, such as latitude/longitude coordinates. The location may then be used to provide emergency services to the caller. For example, a public safety answering point (PSAP), who may dispatch police, fire, emergency medical, first responders, or other response resources to the caller, may use the location information. In addition to or instead of depending on the caller to provide the call recipient with his or her location, certain characteristics of the mobile device used by the caller may be used to determine the caller's location. For example, some methods and systems identify the cell ID of one or more base stations that the mobile device may be in communication with. Additionally or alternatively, some systems and methods request the global positioning system (GPS) coordinates from the mobile device. These systems and methods may have limited accuracy and reliability. For example, a mobile device may be unable to use GPS-based positioning if satellite signals are blocked, such as by trees, buildings, terrain, etc. The accuracy of cell-ID positioning may be so poor as to make it unhelpful, particularly in certain remote areas. There is a need for alternative or supplemental methods and systems for determining the location of an emergency.

SUMMARY

The disclosed systems and methods allow for mobile devices to be accurately located when dialing E911, even when the mobile device is unable to deliver its own location to E911 dispatch services. The present disclosure provides apparatuses and methods for determining the location of a mobile device based on the location of other devices near the mobile device. These other devices may include beacons, wireless routers, Bluetooth® devices, or other wireless access points that mobile device can detect. Once the nearby devices are located, the location of the mobile device itself can be determined or approximated. This information can be shared with the recipient of the emergency call to facilitate assistance to the emergency caller.

The present disclosure is directed to a method that may include determining that an emergency call has been made by a mobile device. It may be requested that the mobile device identify each of the devices it can detect using its wireless radio. Once nearby devices are detected, the method may include determining a location of the mobile device based upon the location of the nearby device. The location of the nearby device may be determined, for example, based upon a response to a first location request sent to the nearby device. The method may also include providing the mobile device location to a recipient of the emergency call.

The present disclosure is also directed to an apparatus that may include a processor and a memory coupled to the processor. The memory may include executable instructions that, when executed by the processor, cause the processor to effectuate operations including determining that an emergency call has been made by a mobile device. It may be requested that the mobile device identify each of the devices it can detect using its wireless radio. Once nearby devices are detected, the operations may include determining a location of the mobile device based upon the location of the nearby device. The location of the nearby device may be determined, for example, based upon a response to a first location request sent to the nearby device. The operations may also include providing the mobile device location to a recipient of the emergency call.

The present disclosure is also directed to a method that may include determining that a mobile device located in a sector has made an emergency call. The method may also include sending, to at least a first device other than the mobile device, the first device located in the sector, a command to determine whether the first device can detect the mobile device. The method may include receiving, from the first device, an indication that the first device detects the mobile device. The method may also include determining a first location associated with the first device, and determining a location of the mobile device based upon the first location. The method may also include providing the mobile device location to a recipient of the emergency call.

BRIEF DESCRIPTION OF THE DRAWINGS

Aspects of the herein described telecommunications network are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1:
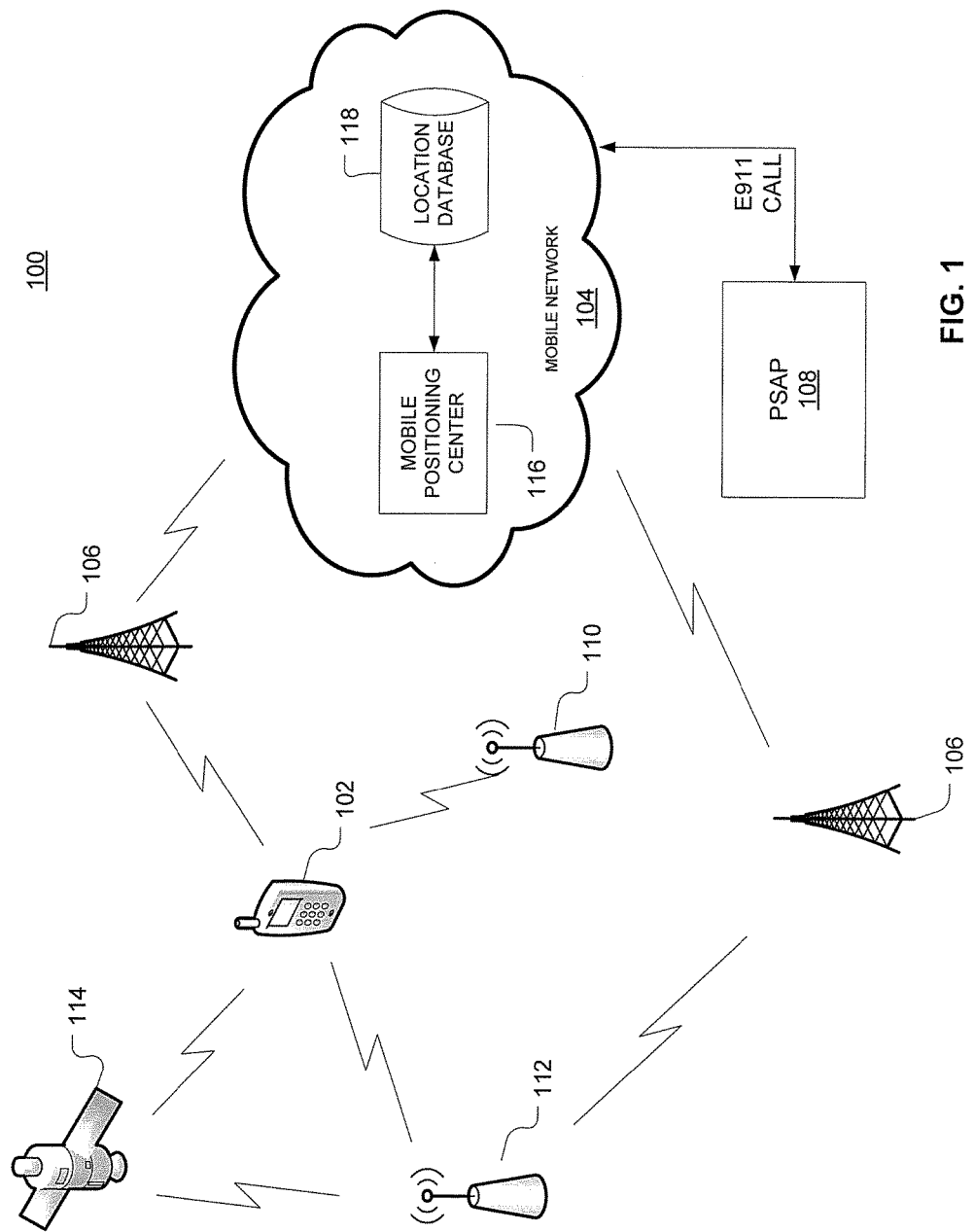
FIG. 1 illustrates an exemplary telecommunication system in which a mobile device may make an emergency call.

FIG. 1 illustrates an exemplary telecommunication system 100 including a mobile device 102. In the context of the present disclosure, mobile device 102 may comprise any appropriate type of user equipment (UE), such as, for example, a mobile device, a tablet, a smart phone, or any type of equipment capable of providing voice and/or data connectivity. Mobile device 102 may be registered on the relevant network. It is to be understood that mobile device 102 as depicted in FIG. 1 is exemplary and not intended to be limiting. Acronyms are used throughout the disclosure that will be understood by those skilled in the art.

As shown in FIG. 1, mobile device 102 may communicate through a mobile network 104 (e.g., long term evolution (LTE), 5G, etc.) via a cell site 106 to a PSAP 18. Telecommunication system 100 may include other access devices, such as access device 110 or access device 112 that may communicate with other devices connected to mobile network 104. Access devices 110, 112 may be any device that mobile device 102 may wirelessly detect. For example, some access devices 110, 112 may be wireless access points, such as a router or other device providing a hotspot. For example, some access devices 110, 112 may be laptops, mobile phones, tablets, or mobile Wi-Fi hotspots (including MiFi® devices) that provide a wireless hotspot. Additionally or alternatively, some access devices 110, 112 may be beacons that broadcast their identifier to nearby devices, such as mobile device 102.

Telecommunication system 100 may include a GPS 114 by which devices, such as access device 110, access device 112, or mobile device 102, may determine their respective locations. Additionally, mobile network 104 may include mechanisms to facilitate communications between PSAP 108 and mobile device 102. For example, mobile network 104 may include mobile positioning center 116, which may provide the location of mobile device 102 to PSAP 108. Additionally or alternatively, mobile positioning center 116 may communicate with a location database 118, which may include locations of at least some devices connected to mobile network 104. It is to be understood that the telecommunication system 100 as depicted in FIG. 1 is exemplary and not intended to be limiting.

Figure 2:
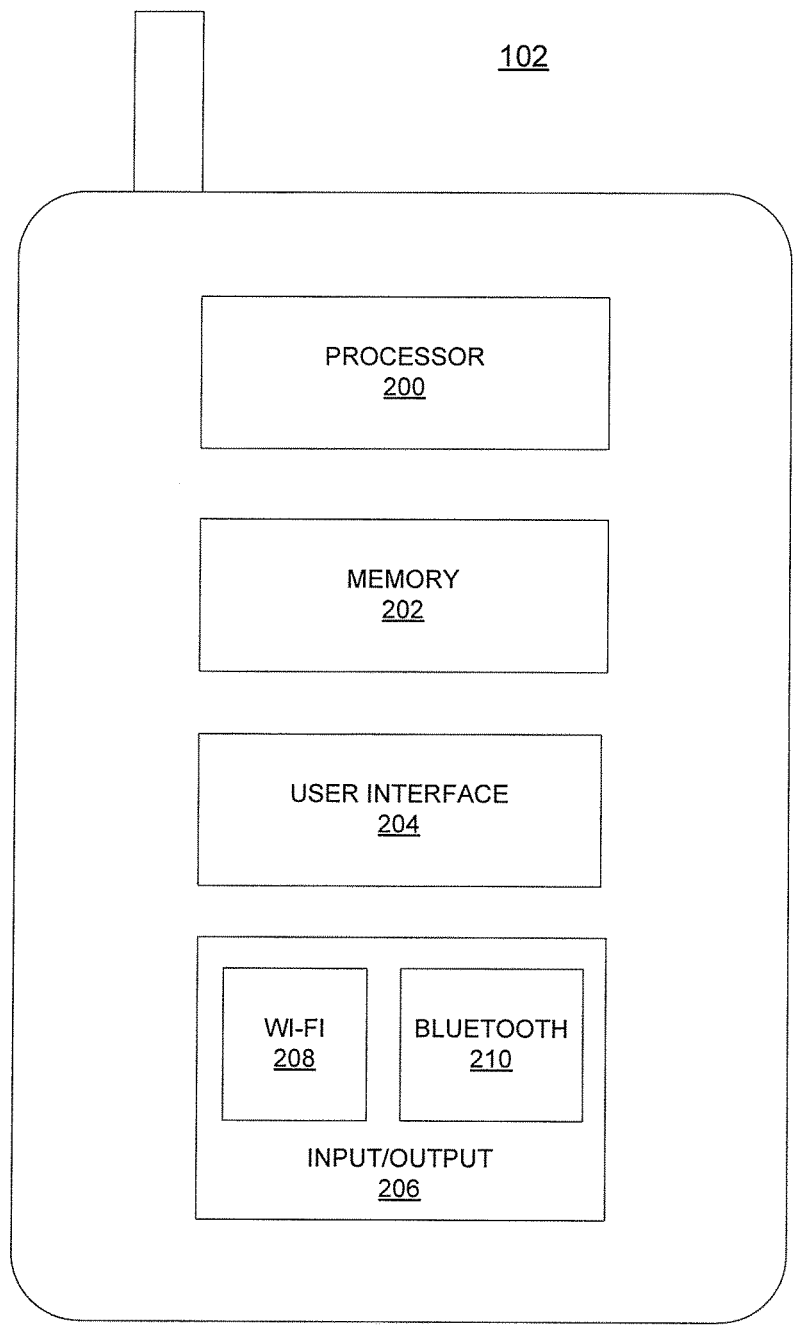
FIG. 2 is a schematic of an exemplary mobile device that may be used to make an emergency call.

FIG. 2 is a block diagram of an exemplary mobile device 102 that may be utilized with a telecommunication network as described herein. Mobile device 102 may comprise or be incorporated into any appropriate device, examples of which may include a mobile device, a mobile communications device, a cellular phone, a portable computing device, such as a laptop, a personal digital assistant (PDA), a portable phone (e.g., a cell phone or the like, a smart phone, a video phone), a portable email device, a portable gaming device, a TV, a DVD player, portable media player, (e.g., a portable music player, such as an MP3 player or a Walkman), a portable navigation device (e.g., GPS compatible device, A-GPS compatible device), or a combination thereof. Mobile device 102 can include devices that are not typically thought of as portable, such as, for example, a public computing device, a navigation device installed in-vehicle, a set top box, or the like. Mobile device 102 can include nonconventional computing devices, such as, for example, a kitchen appliance, a motor vehicle control (e.g., steering wheel), or the like. As evident from the herein description, UE, a device, a communications device, or a mobile device is not to be construed as software per se.

Mobile device 102 may include any appropriate device, mechanism, software, or hardware for communicating with a telecommunication network as described herein.

In an example configuration, mobile device 102 may comprise portions including a processor 200, a memory 202, a user interface (UI) 204, or an input/output 206. Each portion of mobile device 102 may comprise circuitry for performing functions associated with each respective portion. Thus, each portion may comprise hardware or a combination of hardware and software. Accordingly, each portion of mobile device 102 is not to be construed as software per se. It is emphasized that the block diagram depiction of mobile device 102 is exemplary and not intended to imply a specific implementation or configuration. For example, in an example configuration, mobile device 102 may comprise a cellular communications technology, and processor 200 or memory 202 may be implemented, in part or in total, on a subscriber identity module (SIM) of the mobile device 102. In another example configuration, mobile device 102 may comprise a laptop computer. The laptop computer may include a SIM, and various portions of processor 200 or memory 202 may be implemented on the SIM, on the laptop other than the SIM, or any combination thereof.

Processor 200, memory 202, and input/output 206 may be coupled together (coupling not shown in FIG. 2) to allow communications therebetween. Input/output 206 may comprise a receiver of mobile device 102, a transmitter of mobile device 102, or a combination thereof. Input/output 206 may be capable of receiving or providing information pertaining to telecommunications as described herein. In various configurations, input/output 206 may receive or provide information via any appropriate means, such as, for example, optical means (e.g., infrared), electromagnetic means (e.g., radio frequency (RF), Wi-Fi, Bluetooth®, ZigBee®), acoustic means (e.g., speaker, microphone, ultrasonic receiver, ultrasonic transmitter), or a combination thereof. For example, as shown in FIG. 2, input/output 206 may include one or more wireless radios, such as Wi-Fi radio 208 or a Bluetooth® radio 210.

Processor 200 may be capable of performing functions pertaining to telecommunications, including, for example, communicating with other devices in or connected to mobile network 104. In a basic configuration, mobile device 102 may include at least one memory 202, which may comprise executable instructions that, when executed by processor 200, cause processor 200 to effectuate operations associated with a telecommunication network, such as mobile network 104. Memory 202 may comprise a storage medium having a concrete, tangible, physical structure. As is known, a signal does not have a concrete, tangible, physical structure. Memory 202, as well as any computer-readable storage medium described herein, is not to be construed as a signal. Memory 202, as well as any computer-readable storage medium described herein, is not to be construed as a transient signal. Further, memory 202, as well as any computer-readable storage medium described herein, is not to be construed as a propagating signal. Memory 202, as well as any computer-readable storage medium described herein, is to be construed as an article of manufacture.

Memory 202 may store any information utilized in conjunction with telecommunications. Depending upon the exact configuration or type of processor, memory 202 may be volatile (such as some types of RAM), nonvolatile (such as ROM or flash memory), or a combination thereof. Mobile device 102 may include additional storage (e.g., removable storage or nonremovable storage) including, but not limited to, tape, flash memory, smart cards, CD-ROM, DVD, or other optical storage, magnetic cassettes, magnetic tape, magnetic disk storage or other magnetic storage devices, universal serial bus (USB) compatible memory, or any other medium which can be used to store information and which can be accessed by mobile device 102.

Mobile device 102 also may contain UI 204 to allow a user to communicate with it. UI 204 may be capable of rendering any information utilized in conjunction with telecommunications. UI 204 may provide the ability to control mobile device 102, via, for example, buttons, soft keys, voice actuated controls, a touch screen, movement of mobile device 102, visual cues (e.g., moving a hand in front of a camera on mobile device 102), or the like. UI 204 may provide visual information (e.g., via a display), audio information (e.g., via speaker), mechanically (e.g., via a vibrating mechanism), or a combination thereof. In various configurations, UI 204 may comprise a display, a touch screen, a keyboard, an accelerometer, a motion detector, a speaker, a microphone, a camera, a tilt sensor, or any combination thereof. UI 204 may comprise means for inputting biometric information, such as, for example, fingerprint information, retinal information, voice information, or facial characteristic information.

UI 204 may include a display for displaying multimedia such as, for example, application graphical user interfaces, text, images, video, telephony functions such as Caller ID data, setup functions, menus, music, metadata, messages, wallpaper, graphics, Internet content, device status, preferences settings, map or location data, routes or other directions, points of interest, or the like.

Mobile device 102 may be used to send an emergency call through mobile network 104 to a recipient, such as PSAP 108. An emergency call may be a call to an emergency telephone number such as 112 (in the EU), 911 (in the United States), 999 (in Ireland), or it may be a call to a private service. It may be advantageous for mobile device 102 or another device in or connected to mobile network 104 or PSAP 108 to communicate the location of mobile device 102 to the emergency call recipient PSAP 108 in the event mobile device 102 makes an emergency call to PSAP 108. Mobile device 102 may be configured to provide, directly or indirectly, its location to PSAP 108. Additionally or alternatively, another device of telecommunication system 100 may be configured to provide the location of mobile device 102 to PSAP 108. For example, one or more access devices 110, 112 may provide the location of mobile device 18. In another example, mobile positioning center 116 may include a network entity 300, as illustrated in FIG. 3, to determine and/or provide the location of mobile device 102 to PSAP 108.

Figure 3:
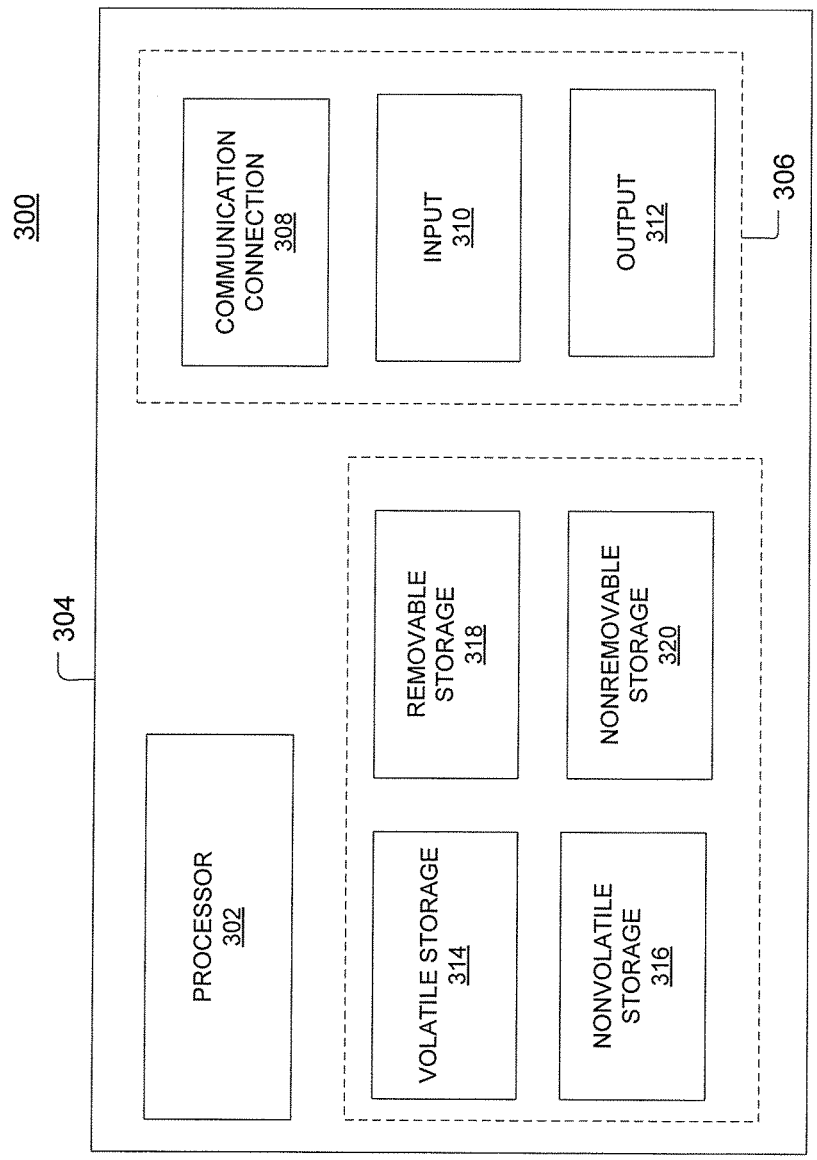
FIG. 3 is a schematic of an exemplary network device that may be used to determine a location of a mobile device.

FIG. 3 is a block diagram of network entity 300 of a telecommunication network (e.g., mobile network 104) as described herein. For example, mobile positioning center 116 may comprise, include, or communicate with network entity 300. Network entity 300 may comprise hardware or a combination of hardware and software. The functionality to facilitate telecommunications via a telecommunications network may reside in any one or combination of network entities 300. Network entity 300 depicted in FIG. 3 may represent or perform functionality of any appropriate network entity 300, or combination of network entities 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a SMLC, or the like, or any appropriate combination thereof. It is emphasized that the block diagram depicted in FIG. 3 is exemplary and not intended to imply a specific implementation or configuration. Thus, network entity 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network entity 300 may comprise a processor 302 and a memory 304 coupled to processor 302. Memory 304 may contain executable instructions that, when executed by processor 302, cause processor 302 to effectuate operations associated with telecommunications via mobile network 104. As evident from the description herein, network entity 300 is not to be construed as software per se.

In addition to processor 302 and memory 304, network entity 300 may include an input/output system 306. Processor 302, memory 304, and input/output system 306 may be coupled together (coupling not shown in FIG. 3) to allow communications therebetween. Each portion of network entity 300 may comprise circuitry for performing functions associated with each respective portion. Thus, each portion may comprise hardware, or a combination of hardware and software. Accordingly, each portion of network entity 300 is not to be construed as software per se. Input/output system 306 may be capable of receiving or providing information from or to a communications device or other network entities configured for telecommunications. For example input/output system 306 may include a wireless communications (e.g., 2.5G/3G/4G/GPS) card. Input/output system 306 may be capable of receiving or sending video information, audio information, control information, image information, data, or any combination thereof. Input/output system 306 may be capable of receiving or sending information that may be used to determine a location of network entity 300. In an example configuration, input/output system 306 may comprise a GPS receiver. In an example configuration, network entity 300 may determine its own geographical location and/or the geographical location of a communications device through any type of location determination system including, for example, GPS, A-GPS, time difference of arrival calculations, configured constant location (in the case of non-moving devices), any combination thereof, or any other appropriate means. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network entity 300 also may contain communication connection 308 that allows network entity 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for identifying location of mobile device 102 in mobile network 104 that is making an emergency call, as described herein. For example, processor 302 may be capable of, in conjunction with any other portion of network entity 300, performing operations to obtain location-based information from mobile device 102 or other devices in mobile network 104, as described herein.

Memory 304 of network entity 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network entity 300. Memory 304 may comprise executable instructions that, when executed by processor 302, cause processor 302 to effectuate operations to determine and provide the location of mobile device 102 to PSAP 108.

Figure 4:
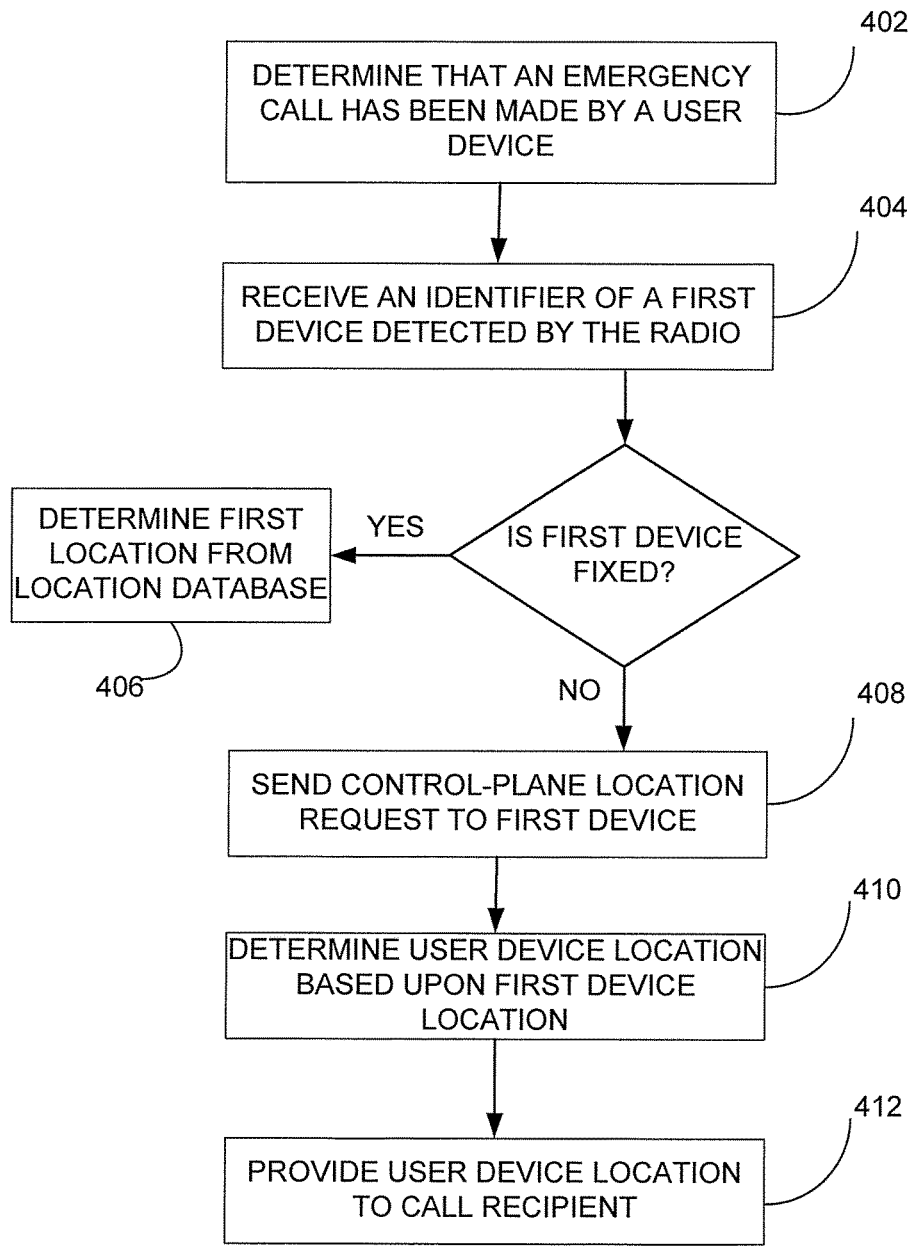
FIG. 4 is a flowchart of an exemplary process for providing the location of a mobile device to the recipient of an emergency call from the mobile device.

FIG. 4 is a flowchart of an exemplary process 400 for providing the location of mobile device 102 to PSAP 108, which received an emergency call from mobile device 102. Process 400 may be implemented by network entity 300. At step 402, the method may include determining that an emergency call has been made by mobile device 102. Optionally, network entity 300 may request that mobile device 102 turn on a wireless radio, such as Wi-Fi radio 208 or Bluetooth® radio 210, associated with mobile device 102.

Figure 5:
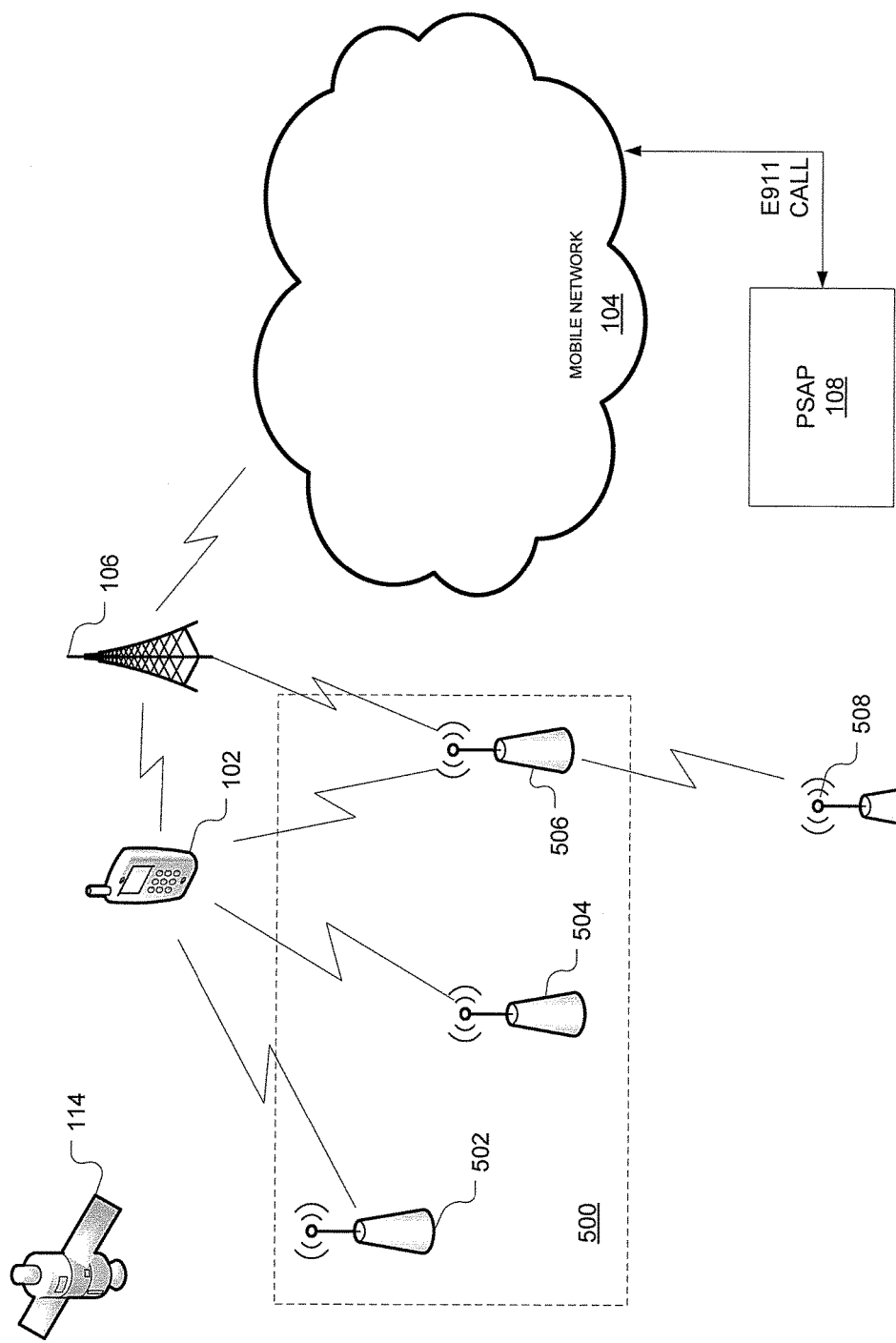
FIG. 5 illustrates an exemplary telecommunication system in which a mobile device may make an emergency call.

Mobile device 102 may detect nearby devices, such as detected devices 500 illustrated in FIG. 5. Detected devices 500 may or may not be fixed. A fixed device may include devices that are generally not mobile, in the sense that during normal use they operate as stationary objects. Fixed devices may include routers or beacons. Devices that are not fixed may include devices that are mobile, such as laptops, mobile phones, tablets, or mobile Wi-Fi hotspots (including MiFi® devices). One or more of mobile devices 502, 506 may be a wireless access point, such as a mobile phone acting as a wireless hotspot, whose location is generally not fixed. In the example shown in FIG. 5, detected devices 500 include a mobile device 502, a fixed device 504, and a mobile device 506. Determining whether detected devices 500 are fixed may include looking up an identifier of each detected device 500 in location database 118.

Each detected device 500 may have an identifier, such as an IMEI, a MAC address, or an IP address that can be determined by mobile device 102 or network entity 300. Those familiar in the art will recognize these and other unique or near-unique identifiers (including identifiers that may be unique only with respect to other devices in the same network) for network-connected devices. Returning to FIG. 4, at step 404, process 400 may include receiving from mobile device 102, the identifiers of at least one of detected devices 500. These identifiers may be received in response to a request sent to mobile device 102, or mobile device 102 may send the identifiers without receiving a request or other prompt.

The next steps 406 and 408 determine the location of each of detected devices 500. For devices that are not fixed, such as mobile devices 502, 506, at step 408, process 400 may include sending a first location request to the mobile devices 502, 506. The first location request may be a control-plane location request. For fixed devices 504, at step 406, process 400 may include looking up the location of fixed device 504 in location database 118, such as a MAC location database. In response to location requests, mobile devices 502, 506 may return their locations.

Process 400 may include determining that mobile device 506 cannot determine its location. For example, mobile device 506 may be unable to receive a signal from GPS 114. Under such circumstances, process 400 may include determining the location of mobile device 506 through similar methods as those recited in steps 404 through 410. For example, this may include receiving a second identifier of a second device 508 detected by mobile device 506. If second device 508 is not fixed, process 400 may also include sending a second location request to second device 508 to determine its location. The second location request may be a control-plane location request. Then, this may include determining the location of mobile device 506 based on the location of second device 508. This information, in turn, may be used to determine the location of mobile device 102.

At step 410, process 400 may include determining the location of mobile device 102 based upon the location of at least one detected device 500. For example, if mobile device 102 only detects one device 500, or only the location of one detected device 500 is determined, step 410 may include identifying the location of that one detected device 500 as the location mobile device 102. In another example, if multiple detected device locations are available, step 410 may include calculating or determining the centroid of the detected locations to determine the location of mobile device 102. At step 412, process 400 may include providing the mobile device location to a recipient of the emergency call, such as PSAP 108.

Process 400 may include determining the accuracy of the determined mobile device location based upon a number of factors. For example, the accuracy of the mobile device location may depend on the method by which mobile device 102 detected devices 500. For example, the accuracy may depend upon the type of wireless radio, such as Wi-Fi 208 or Bluetooth® 210, used to detect devices 500. The accuracy may also depend on the number of devices 500 detected or the number of detected device locations that factored into determining the mobile device location. Additionally or alternatively, the accuracy may depend upon the signal strength between mobile device 102 and detected devices 500. The accuracy may also depend upon the signal strength between detected devices 500 or mobile device 102 and another network entity 300. Process 400 may include providing this accuracy information to the recipient.

Figure 6:
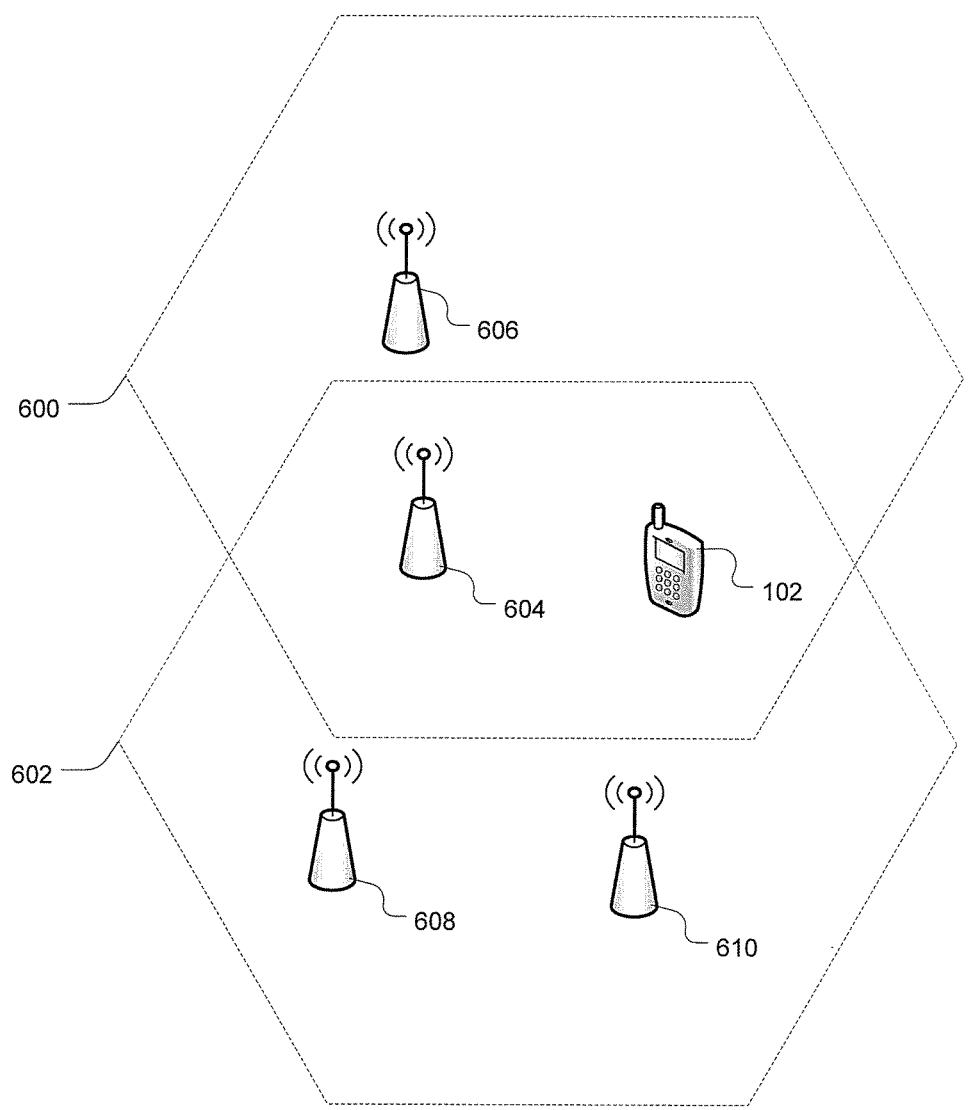
FIG. 6 illustrates an exemplary telecommunication system in which a mobile device may be located in one or more sectors.

A general area, or sector, that contains mobile device 102 may already be known, and this information may be used to determine a more specific location of mobile device 102. For example, in FIG. 6, mobile device 102 is located in two sectors 600, 602. A sector may be a zone of coverage of a cellular tower, a sector of a zone of coverage, a geographic region within a zone of coverage, a cell, a micro cell, a pico cell, a Femto cell, a building, or any appropriate combination thereof. FIG. 6 depicts sectors 600, 602 as hexagons, but it is to be understood that the shapes are for the sake of example only. Thus, no sector should be limited to the shape depicted in FIG. 6. Further, the number of sectors 600, 602 is exemplary. Thus, there may be any appropriate number of sectors 600, 602. Further, as illustrated in FIG. 6, sectors 600, 602 may overlap. However, in other examples, sectors 600, 602 may be defined such that they do not overlap. A device, like mobile device 102, may reside in one or more sectors 600. For example, as shown in FIG. 6, both mobile device 102 and access device 604 reside in two sectors 600, 602. As another example, access device 606 resides in one sector 600, and access devices 608, 610 reside in one sector 602.

Figure 7:
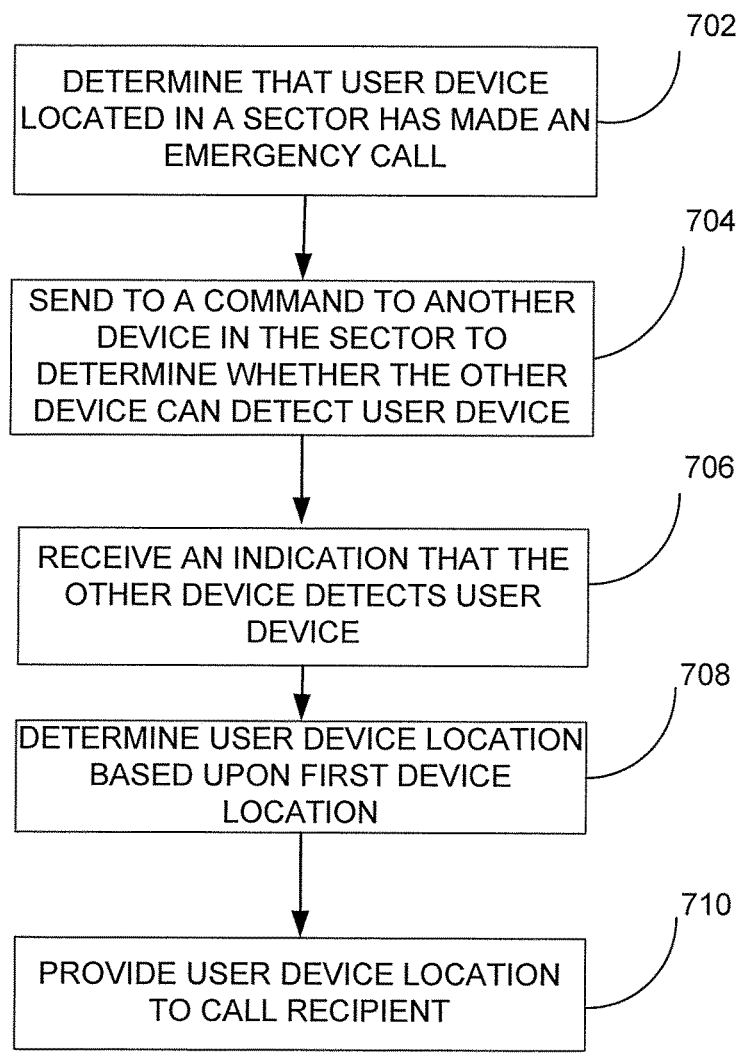
FIG. 7 is a flowchart of an exemplary process for providing the location of a mobile device to the recipient of an emergency call from the mobile device.

FIG. 7 is a flowchart of an exemplary process 700 for providing the location of mobile device 102 to PSAP 108, which received an emergency call from mobile device 102. Step 702 of process 700 may include determining mobile device 102 has made an emergency call. Mobile device 102 may be in one or more sectors. For example, FIG. 6 shows mobile device 102 residing in sector 600 and sector 602.

Step 704 may include sending, to another device, such as another wireless or mobile device, in a sector containing mobile device 102, a command to determine whether that device can detect mobile device 102. The command may include an identifier of mobile device 102, such as an IMEI, a MAC address, or an IP address. Those familiar in the art will recognize these and other unique or near-unique identifiers (including identifiers that are unique only with respect to other devices in the same network) for network-connected devices like mobile device 102.

Step 704 may include sending the command to all devices that are in any of sectors 600, 602 that contain mobile device 102. For instance, the command may be sent to access devices 604, 606, 608, 610. Additionally or alternatively, the command may be sent only to those devices that are in all sectors 600, 602 that contain mobile device 102. For instance, the command may be sent to access device 608, the only other device shown in FIG. 6 that resides in both sectors 600, 602. Additionally or alternatively, the command may be sent to one or more access devices 604, 606, 608, 610 in less than all of the sectors 600, 602 that contain mobile device 102. For instance, the command may be sent to all devices that reside in sector 600: access devices 604, 606. Or, the command may be sent to all devices that reside in sector 602: access devices 608, 610. As another example, the command may be sent to less than all of access devices 604, 606, 608, 610 that are located in a specific region. For example, the command may be sent to three access devices 604, 606, 608, 610 that reside in either sector 600 or sector 602. The selection of which access device(s) 604, 606, 608, 610 to which the command of step 702 may vary as long as at least one access device 604, 606, 608, 610 (other than mobile device 102) located in at least one sector 600 and 602 containing mobile device 102 receives the command.

At step 706, process 700 may include receiving, from one or more access devices 604, 606, 608, 610 that received the command sent in step 704, an indication that one or more access devices 604, 606, 608, 610 detects mobile device 102. For example, the command of step 704 may have been sent to access devices 604, 606, 608, and at step 706, process 700 may include receiving an indication that access devices 604, 606 detect mobile device 102.

Process 700 may also include determining the locations of access devices 604, 606, 608, 610 that detected mobile device 102. The method for making this determination may depend on whether the access devices 604, 606, 608, 610 that detected mobile device 102 are fixed or not fixed. A fixed device may include devices that are generally not mobile, in the sense that during normal use they operate as stationary objects. Fixed devices may include routers or beacons. Devices that are not fixed may include devices that are mobile, such as laptops, mobile phones, tablets, or mobile Wi-Fi hotspots (including MiFis). Access devices 604, 606, 608, 610 that are not fixed may include a wireless access point, such as a mobile phone acting as a wireless hotspot, whose location is generally not fixed.

If access device 604 that detects mobile device 102 is fixed, determining the location of access device 604 may include querying database 118 that includes device locations. If access device 604 that detects mobile device 102 is not fixed, determining the location of access device 604 may include sending a location request to access device 604. The location request may be a control-plane location request.

At step 708, process 700 may include determining a location of mobile device 102 based upon the location of at least one of the access device(s) that detected mobile device 102. When more than one access device 604, 606, 608, 610 has detected mobile device 102, step 708 may include determining the location of mobile device 102 by calculating the centroid of the locations of access devices 604, 606, 608, 610 that detected mobile device 102. For example, if step 706 includes receiving an indication that mobile device 102 was detected by access devices 604, 606, step 708 may include determining the centroid of the locations of access devices 604, 606. As another example, if step 706 includes receiving an indication from at least access device 604, step 708 may include determining that mobile device location is the location of access device 604.

At step 710, process 700 may include providing the mobile device location to a recipient of the emergency call. For example the mobile device location may be provided to PSAP 108.

Process 700 may include determining the accuracy of the determined mobile device location based upon a number of factors. For example, the accuracy of the mobile device location may depend on the method by which one or more access devices 604, 606, 608, 610 detected mobile device 102. For example, the accuracy may depend upon the type of wireless radio, such as Wi-Fi 208 or Bluetooth® 210, used to detect mobile device 102. The accuracy may also depend on the number of access devices 604, 606, 608, 610 to which the command in step 704 was sent, the number of access devices 604, 606, 608, 610 that detected mobile device 102, or the number of detected device locations that factored into determining the mobile device location. Additionally or alternatively, the accuracy may depend upon the signal strength between mobile device 102 and access devices 604, 606, 608, 610 that detected mobile device 102. The accuracy may also depend upon the signal strength between access devices 604, 606, 608, 610 that detected mobile device 102 or mobile device 102 and another network entity 300. Process 700 may include providing this accuracy information to the recipient.

Figure 8:
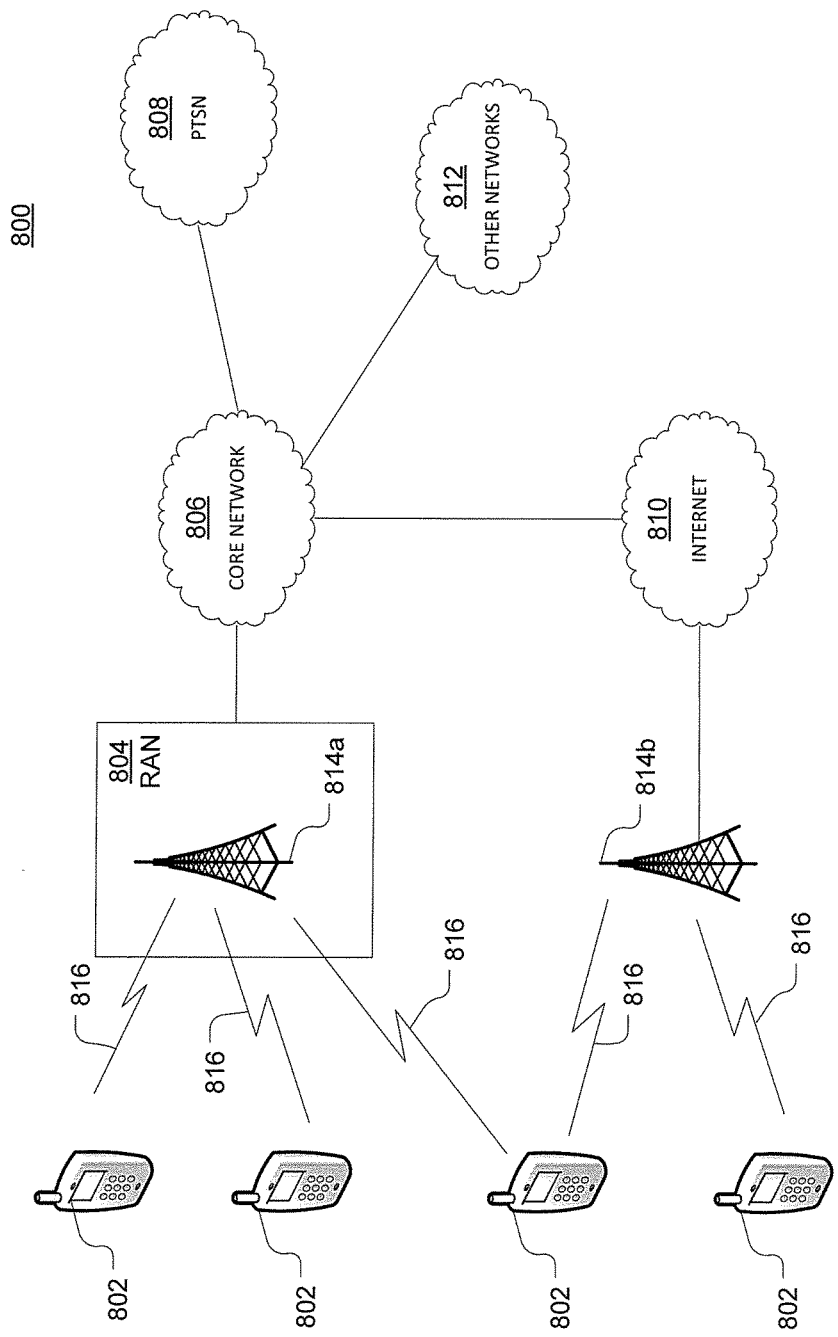
FIG. 8 is a diagram of an exemplary telecommunications system in which the disclosed methods and processes may be implemented.

FIG. 8 is a diagram of an exemplary telecommunication system 800 in which the disclosed methods and processes may be implemented. Telecommunication system 800 may be a multiple access system that provides content, such as voice, data, video, messaging, or broadcast to multiple wireless devices. Telecommunication system 800 may enable multiple wireless devices to access such content through the sharing of system resources, including wireless bandwidth. For example, telecommunication system 800 may employ one or more channel access methods, such as code division multiple access (CDMA), time division multiple access (TDMA), frequency division multiple access (FDMA), orthogonal FDMA (OFDMA), single-carrier FDMA (SC-FDMA), or the like. Telecommunication system 800 may also be referred to herein as a network.

As shown in FIG. 8, telecommunication system 800 may include wireless transmit/receive units (WTRUs) 802, a RAN 804, a core network 806, a public switched telephone network (PSTN) 808, the Internet 810, or other networks 812, though it will be appreciated that the disclosed examples contemplate any number of WTRUs, base stations, networks, or network elements. Each WTRU 802 may be any type of device configured to operate or communicate in a wireless environment. For example, a WTRU may comprise mobile device 102, access device 110, access device 112, mobile positioning center 116, network entity 300, any of detected devices 500, second device 508, access device 604, access device 606, access device 608, access device 610 or the like, or any combination thereof. By way of example, WTRUs 802 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like.

Telecommunication system 800 may also include one or more base stations 814*a*, 814*b*. Each of base stations 814*a*, 814*b* may be any type of device configured to wirelessly interface with at least one of the WTRUs 802 to facilitate access to one or more communication networks, such as core network 806, PTSN 808, Internet 810, or other networks 812. By way of example, base stations 814*a*, 814*b* may be a base transceiver station (BTS), a Node-B, an eNode B, a Home Node B, a Home eNode B, a site controller, an access point (AP), a wireless router, or the like. While base stations 814*a*, 814*b* are each depicted as a single element, it will be appreciated that base stations 814*a*, 814*b* may include any number of interconnected base stations or network elements.

Base station 814*a* may be part of RAN 804, which may also include other base stations or network elements (not shown), such as a base station controller (BSC), a radio network controller (RNC), or relay nodes. One or more base stations 814 may be configured to transmit or receive wireless signals within a particular geographic region, which may be referred to as a cell (not shown). The cell may further be divided into cell sectors. For example, the cell associated with base station 814*a* may be divided into three sectors such that base station 814*a* may include three transceivers: one for each sector of the cell. In another example, base station 814*a* may employ multiple-input multiple-output (MIMO) technology and, therefore, may utilize multiple transceivers for each sector of the cell.

Base stations 814*a*, 814*b* may communicate with one or more of WTRUs 802 over an air interface 816, which may be any suitable wireless communication link (e.g., RF, microwave, infrared (IR), ultraviolet (UV), or visible light). Air interface 816 may be established using any suitable radio access technology (RAT).

More specifically, as noted above, telecommunication system 800 may be a multiple access system and may employ one or more channel access schemes, such as CDMA, TDMA, FDMA, OFDMA, SC-FDMA, or the like. For example, base station 814*a* in RAN 804 and WTRUs 802 connected to RAN 804 may implement a radio technology such as Universal Mobile Telecommunications System (UMTS) Terrestrial Radio Access (UTRA) that may establish air interface 816 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 814*a* and WTRUs 802 that are connected to RAN 804 may implement a radio technology such as Evolved UMTS Terrestrial Radio Access (E-UTRA), which may establish air interface 816 using LTE or LTE-Advanced (LTE-A).

Optionally base station 814*a* and WTRUs 802 connected to RAN 804 may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 814*b* may be a wireless router, Home Node B, Home eNode B, or access point, for example, and may utilize any suitable RAT for facilitating wireless connectivity in a localized area, such as a place of business, a home, a vehicle, a campus, or the like. For example, base station 814*b* and associated WTRUs 802 may implement a radio technology such as IEEE 802.11 to establish a wireless local area network (WLAN). As another example, base station 814*b* and associated WTRUs 802 may implement a radio technology such as IEEE 802.15 to establish a wireless personal area network (WPAN). In yet another example, base station 814*b* and associated WTRUs 802 may utilize a cellular-based RAT (e.g., WCDMA, CDMA2000, GSM, LTE, LTE-A, etc.) to establish a picocell or femtocell. As shown in FIG. 8, base station 814*b* may have a direct connection to Internet 810. Thus, base station 814*a* may not be required to access Internet 810 via core network 806.

RAN 804 may be in communication with core network 806, which may be any type of network configured to provide voice, data, applications, and/or voice over internet protocol (VoIP) services to one or more WTRUs 802. For example, core network 806 may provide call control, billing services, mobile location-based services, pre-paid calling, Internet connectivity, video distribution or high-level security functions, such as user authentication. Although not shown in FIG. 8, it will be appreciated that RAN 804 or core network 806 may be in direct or indirect communication with other RANs that employ the same RAT as RAN 804 or a different RAT. For example, in addition to being connected to RAN 804, which may be utilizing an E-UTRA radio technology, core network 806 may also be in communication with another RAN (not shown) employing a GSM radio technology.

Core network 806 may also serve as a gateway for WTRUs 802 to access PSTN 808, Internet 810, or other networks 812. PSTN 808 may include circuit-switched telephone networks that provide plain old telephone service (POTS). Internet 810 may include a global system of interconnected computer networks or devices that use common communication protocols, such as the transmission control protocol (TCP), user datagram protocol (UDP), or IP in the TCP/IP internet protocol suite. Other networks 812 may include wired or wireless communications networks owned or operated by other service providers. For example, other networks 812 may include another core network connected to one or more RANs, which may employ the same RAT as RAN 804 or a different RAT.

Some or all WTRUs 802 in telecommunication system 800 may include multi-mode capabilities. That is, WTRUs 802 may include multiple transceivers for communicating with different wireless networks over different wireless links. For example, one or more WTRUs 802 may be configured to communicate with base station 814a, which may employ a cellular-based radio technology, and with base station 814b, which may employ an IEEE 802 radio technology.

Figure 9:
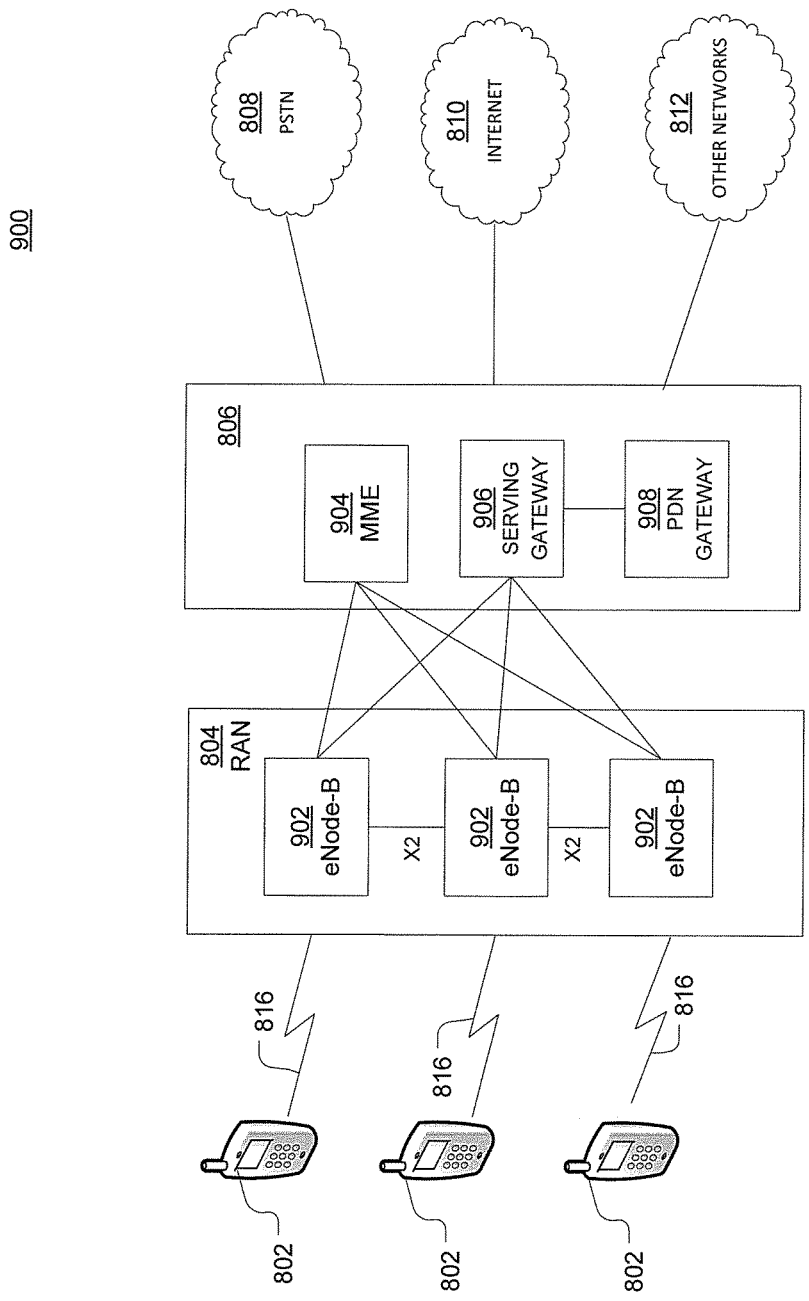
FIG. 9 is an example system diagram of a radio access network and a core network.

FIG. 9 is an example system 900 including RAN 804 and core network 806. As noted above, RAN 804 may employ an E-UTRA radio technology to communicate with WTRUs 802 over air interface 816. RAN 804 may also be in communication with core network 806.

RAN 804 may include any number of eNode-Bs 902 while remaining consistent with the disclosed technology. One or more eNode-Bs 902 may include one or more transceivers for communicating with the WTRUs 802 over the air interface 816. Optionally, eNode-Bs 902 may implement MIMO technology. Thus, one of eNode-Bs 902, for example, may use multiple antennas to transmit wireless signals to, or receive wireless signals from, one of WTRUs 802.

Each of eNode-Bs 902 may be associated with a particular cell (not shown) and may be configured to handle radio resource management decisions, handover decisions, scheduling of users in the uplink or downlink, or the like. As shown in FIG. 9 eNode-Bs 902 may communicate with one another over an X2 interface.

Core network 806 shown in FIG. 9 may include a mobility management gateway or entity (MME) 904, a serving gateway 906, or a packet data network (PDN) gateway 908. While each of the foregoing elements are depicted as part of core network 806, it will be appreciated that any one of these elements may be owned or operated by an entity other than the core network operator.

MME 904 may be connected to each of eNode-Bs 902 in RAN 804 via an S1 interface and may serve as a control node. For example, MME 904 may be responsible for authenticating users of WTRUs 802, bearer activation or deactivation, selecting a particular serving gateway during an initial attach of WTRUs 802, or the like. MME 904 may also provide a control plane function for switching between RAN 804 and other RANs (not shown) that employ other radio technologies, such as GSM or WCDMA.

Serving gateway 906 may be connected to each of eNode-Bs 902 in RAN 804 via the S1 interface. Serving gateway 906 may generally route or forward user data packets to or from the WTRUs 802. Serving gateway 906 may also perform other functions, such as anchoring user planes during inter-eNode B handovers, triggering paging when downlink data is available for WTRUs 802, managing or storing contexts of WTRUs 802, or the like.

Serving gateway 906 may also be connected to PDN gateway 146, which may provide WTRUs 802 with access to packet-switched networks, such as Internet 810, to facilitate communications between WTRUs 802 and IP-enabled devices.

Core network 806 may facilitate communications with other networks. For example, core network 806 may provide WTRUs 802 with access to circuit-switched networks, such as PSTN 808, to facilitate communications between WTRUs 802 and traditional land-line communications devices. For example, core network 806 may include, or may communicate with, an IP gateway (e.g., an IP multimedia subsystem (IMS) server) that serves as an interface between core network 806 and PSTN 108. In addition, core network 806 may provide the WTRUs 802 with access to other networks 812, which may include other wired or wireless networks that are owned or operated by other service providers.

Figure 10:
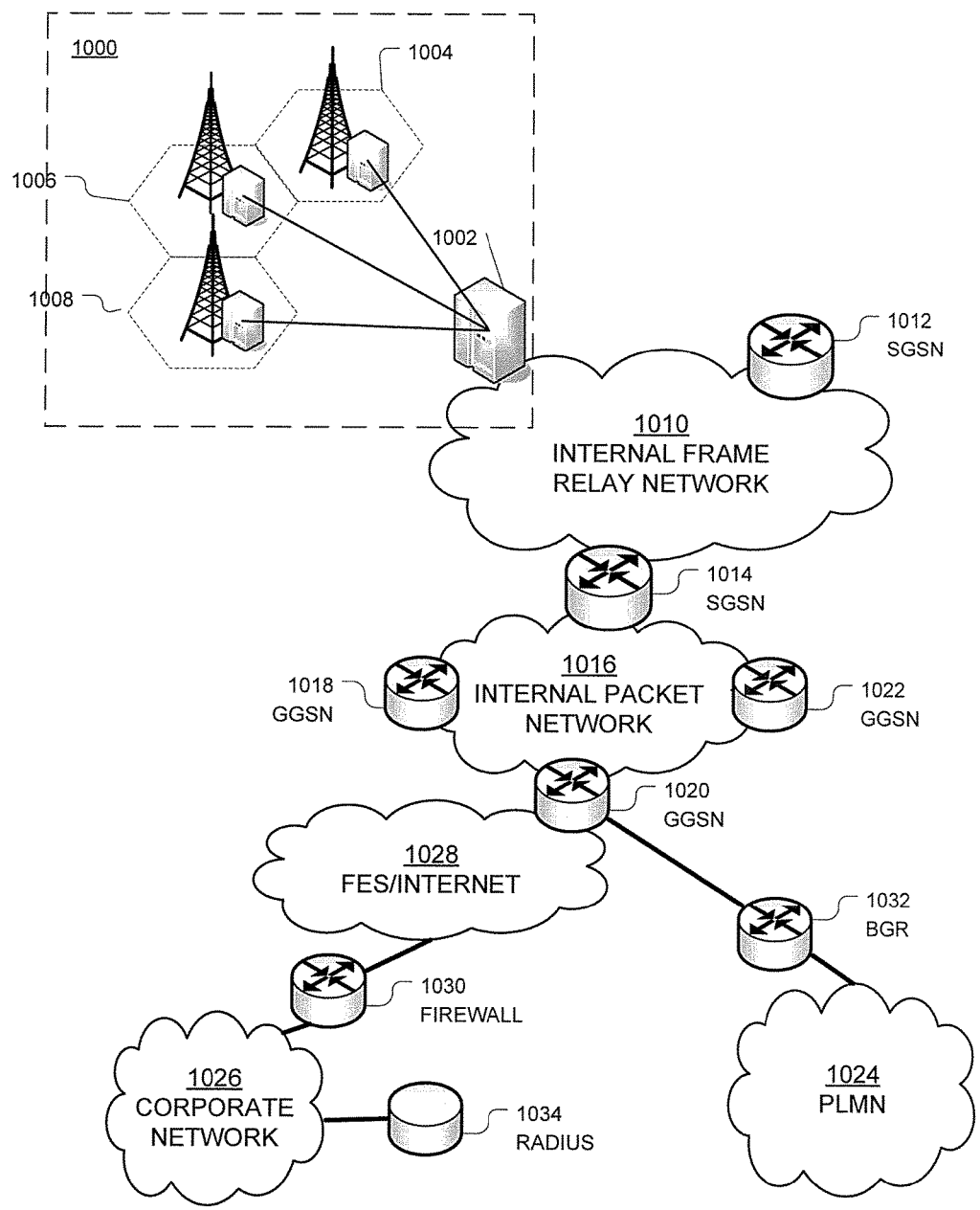
FIG. 10 depicts an overall block diagram of an example packet-based mobile cellular network environment, such as a general packet radio service (GPRS) network.

FIG. 10 depicts an overall block diagram of an example packet-based mobile cellular network environment, such as a GPRS network as described herein. In the example packet-based mobile cellular network environment shown in FIG. 10, there are a plurality of base station subsystems (BSS) 1000 (only one is shown), each of which comprises a base station controller (BSC) 1002 serving a plurality of BTSs, such as BTSs 1004, 1006, 1008. BTSs 1004, 1006, 1008 are the access points where users of packet-based mobile devices become connected to the wireless network. In example fashion, the packet traffic originating from mobile devices is transported via an over-the-air interface to BTS 1008, and from BTS 1008 to BSC 1002. Base station subsystems, such as BSS 1000, are a part of internal frame relay network 1010 that can include a service GPRS support nodes (SGSN), such as SGSN 1012 or SGSN 1014. Each SGSN 1012, 1014 is connected to an internal packet network 1016 through which SGSN 1012, 1014 can route data packets to or from a plurality of gateway GPRS support nodes (GGSN) 1018, 1020, 1022. As illustrated, SGSN 1014 and GGSNs 1018, 1020, 1022 are part of internal packet network 1016. GGSNs 1018, 1020, 1022 mainly provide an interface to external IP networks such as PLMN 1024, corporate intranets/internets 1026, or Fixed-End System (FES) or the public Internet 1028. As illustrated, subscriber corporate network 1026 may be connected to GGSN 1020 via a firewall 1030. PLMN 1024 may be connected to GGSN 1020 via a boarder gateway router (BGR) 1032. A Remote Authentication Dial-In User Service (RADIUS) server 1034 may be used for caller authentication when a user calls corporate network 1026.

Generally, there may be a several cell sizes in a GSM network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 11:
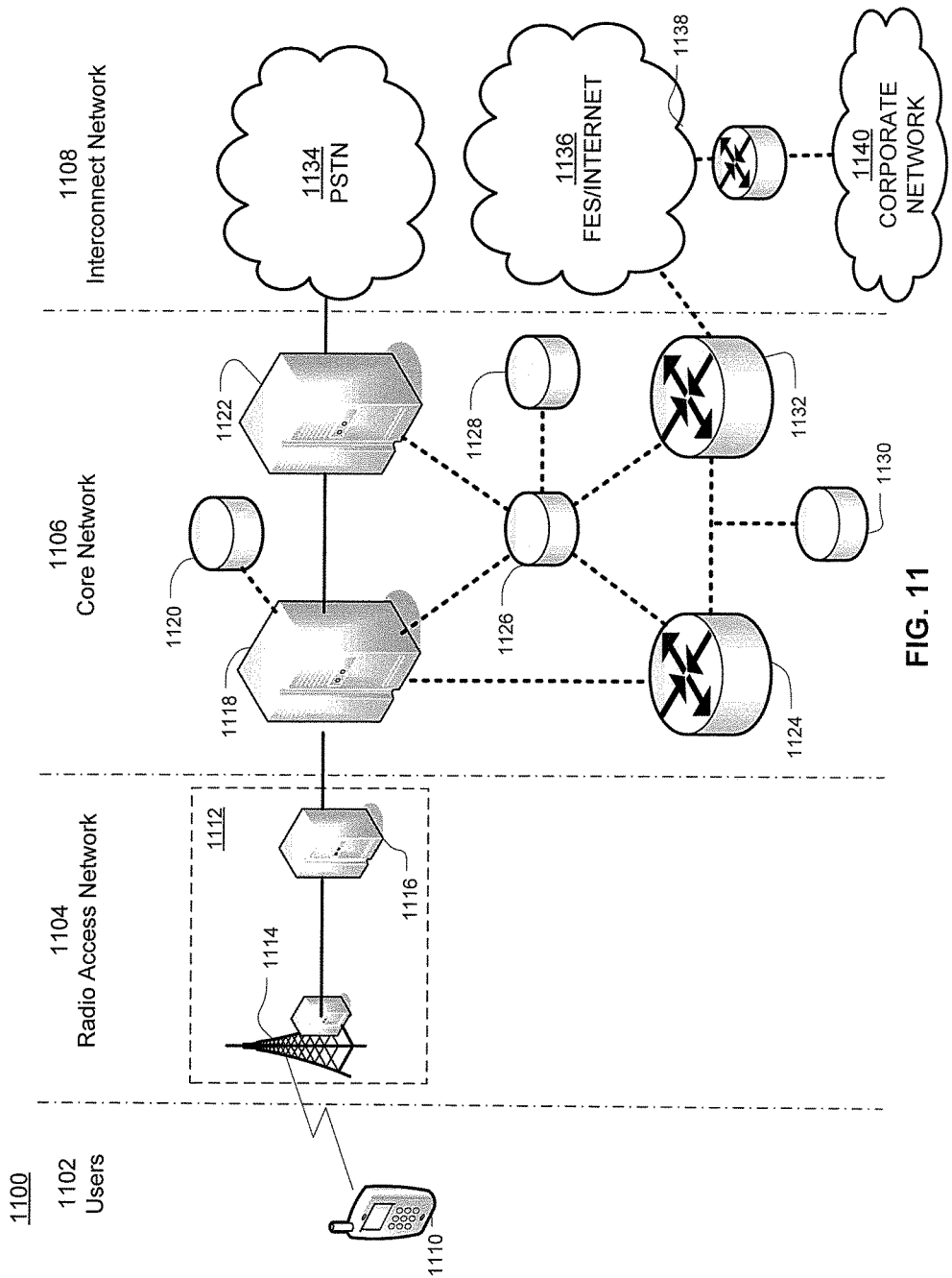
FIG. 11 illustrates an exemplary architecture of a GPRS network.

FIG. 11 illustrates an architecture of a typical GPRS network 1100 as described herein. The architecture depicted in FIG. 11 may be segmented into four groups: users 1102, RAN 1104, core network 1106, and interconnect network 1108. Users 1102 comprise a plurality of end users, who each may use one or more devices 1110. Note that device 1110 is referred to as a mobile subscriber (MS) in the description of network shown in FIG. 11. In an example, device 1110 comprises a communications device (e.g., mobile device 102, mobile positioning center 116, network entity 300, any of detected devices 500, second device 508, access device 604, access device 606, access device 608, access device 610 or the like, or any combination thereof). Radio access network 1104 comprises a plurality of BSSs such as BSS 1112, which includes a BTS 1114 and a BSC 1116. Core network 1106 may include a host of various network elements. As illustrated in FIG. 11, core network 1106 may comprise MSC 1118, service control point (SCP) 1120, gateway MSC (GMSC) 1122, SGSN 1124, home location register (HLR) 1126, authentication center (AuC) 1128, domain name system (DNS) server 1130, and GGSN 1132. Interconnect network 1108 may also comprise a host of various networks or other network elements. As illustrated in FIG. 11, interconnect network 1108 comprises a PSTN 1134, an FES/Internet 1136, a firewall 1138, or a corporate network 1140.

An MSC can be connected to a large number of BSCs. At MSC 1118, for instance, depending on the type of traffic, the traffic may be separated in that voice may be sent to PSTN 1134 through GMSC 1122, or data may be sent to SGSN 1124, which then sends the data traffic to GGSN 1132 for further forwarding.

When MSC 1118 receives call traffic, for example, from BSC 1116, it sends a query to a database hosted by SCP 1120, which processes the request and issues a response to MSC 1118 so that it may continue call processing as appropriate.

HLR 1126 is a centralized database for users to register to the GPRS network. HLR 1126 stores static information about the subscribers such as the International Mobile Subscriber Identity (IMSI), subscribed services, or a key for authenticating the subscriber. HLR 1126 also stores dynamic subscriber information such as the current location of the MS. Associated with HLR 1126 is AuC 1128, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 11, when MS 1110 initiates the attach process by turning on the network capabilities of the mobile device, an attach request is sent by MS 1110 to SGSN 1124. The SGSN 1124 queries another SGSN, to which MS 1110 was attached before, for the identity of MS 1110. Upon receiving the identity of MS 1110 from the other SGSN, SGSN 1124 requests more information from MS 1110. This information is used to authenticate MS 1110 to SGSN 1124 by HLR 1126. Once verified, SGSN 1124 sends a location update to HLR 1126 indicating the change of location to a new SGSN, in this case SGSN 1124. HLR 1126 notifies the old SGSN, to which MS 1110 was attached before, to cancel the location process for MS 1110. HLR 1126 then notifies SGSN 1124 that the location update has been performed. At this time, SGSN 1124 sends an Attach Accept message to MS 1110, which in turn sends an Attach Complete message to SGSN 1124.

After attaching itself with the network, MS 1110 then goes through the authentication process. In the authentication process, SGSN 1124 sends the authentication information to HLR 1126, which sends information back to SGSN 1124 based on the user profile that was part of the user's initial setup. SGSN 1124 then sends a request for authentication and ciphering to MS 1110. MS 1110 uses an algorithm to send the user identification and password to SGSN 1124. SGSN 1124 uses the same algorithm and compares the result. If a match occurs, SGSN 1124 authenticates MS 1110.

Next, MS 1110 establishes a user session with the destination network, corporate network 1140, by going through a Packet Data Protocol (PDP) activation process. Briefly, in the process, MS 1110 requests access to the Access Point Name (APN), for example, UPS.com, and SGSN 1124 receives the activation request from MS 1110. SGSN 1124 then initiates a DNS query to learn which GGSN 1132 has access to the UPS.com APN. The DNS query is sent to a DNS server within core network 1106, such as DNS server 1130, which is provisioned to map to one or more GGSNs in core network 1106. Based on the APN, the mapped GGSN 1132 can access requested corporate network 1140. SGSN 1124 then sends to GGSN 1132 a Create PDP Context Request message that contains necessary information. GGSN 1132 sends a Create PDP Context Response message to SGSN 1124, which then sends an Activate PDP Context Accept message to MS 1110.

Once activated, data packets of the call made by MS 1110 can then go through RAN 1104, core network 1106, and interconnect network 1108, in a particular FES/Internet 1136 and firewall 1138, to reach corporate network 1140.

Figure 12:
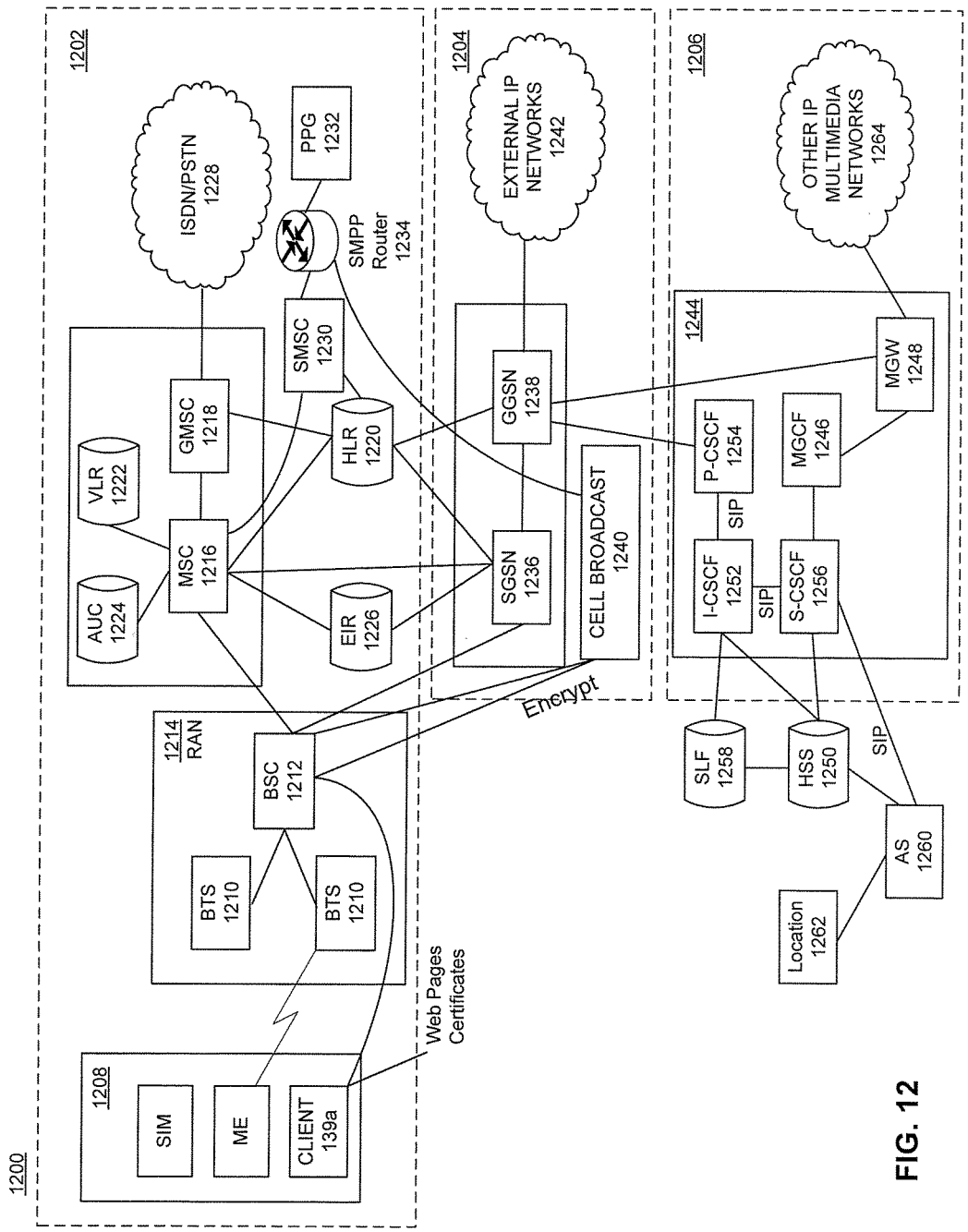
FIG. 12 illustrates an example block diagram view of a global system for mobile communications (GSM)/GPRS/internet protocol (IP) multimedia network architecture.

FIG. 12 illustrates an example block diagram view of a GSM/GPRS/IP multimedia network architecture 1200 as described herein. As illustrated, architecture 1200 includes a GSM core network 1202, a GPRS network 1204 and an IP multimedia network 1206. GSM core network 1202 includes an MS 1208, a BTS 1210, and a BSC 1212. MS 1208 is physical equipment or mobile equipment, such as a mobile phone or a laptop computer that is used by mobile subscribers, with a SIM or a Universal Integrated Circuit Card (UICC). The SIM or UICC includes an IMSI which is a unique identifier of a subscriber. BTS 1210 is physical equipment, such as a radio tower, that enables a radio interface to communicate with MS 1208. Each BTS 1210 may serve more than one MS 1208. BSC 1212 manages radio resources, including BTS 1210. BSC 1210 may be connected to several BTSs 1210. BSC 1212 and BTS 1210 components, in combination, are generally referred to as a BSS or RAN 1214.

GSM core network 1202 also includes a MSC 1216, a GMSC 1218, an HLR 1220, a visitor location register (VLR) 1222, an AuC 1224, and an equipment identity register (EIR) 1226. MSC 1216 performs a switching function for the network. MSC 1216 also performs other functions, such as registration, authentication, location updating, handovers, or call routing. GMSC 1218 provides a gateway between GSM network 1202 and other networks, such as an Integrated Services Digital Network (ISDN) or PSTN 1228. Thus, the GMSC 1218 provides interworking functionality with external networks.

HLR 1220 is a database that contains administrative information regarding each subscriber registered in corresponding GSM network 1202. HLR 1220 also contains the current location of each MS. VLR 1222 is a database that contains selected administrative information from HLR 1220. VLR 1222 contains information necessary for call control and provision of subscribed services for each MS

1208 currently located in a geographical area controlled by VLR 1222. HLR 1220 and VLR 1222, together with MSC 1216, provide the call routing and roaming capabilities of GSM. AuC 1224 provides the parameters needed for authentication and encryption functions. Such parameters allow verification of a subscriber's identity. EIR 1226 stores security-sensitive information about the mobile equipment.

An SMSC 1230 allows one-to-one short message service (SMS) messages to be sent to or from MS 1208. A push proxy gateway (PPG) 1232 is used to "push" (i.e., send without a synchronous request) content to MS 1208. PPG 1232 acts as a proxy between wired and wireless networks to facilitate pushing of data to MS 1002. A short message peer-to-peer (SMPP) protocol router 1234 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, or SMS, MS 1208 first registers with the network to indicate its current location by performing a location update and IMSI attach procedure. MS 1208 sends a location update including its current location information to the MSC 1216/VLR 1222, via BTS 1210 and the BSC 1212. The location information is then sent to HLR 1220 of MS 1208. HLR 1220 is updated with the location information received from the MSC 1216/VLR 1222. The location update also is performed when MS 1208 moves to a new location area. Typically, the location update is periodically performed to update the database as location updating events occur.

GPRS network 1204 is logically implemented on GSM core network 1202 architecture by introducing two packet-switching network nodes, an SGSN 1236, a cell broadcast and a GGSN 1238. SGSN 1236 is at the same hierarchical level as MSC 1216 in GSM network 1202. SGSN 1236 controls the connection between GPRS network 1204 and MS 1208. SGSN 1236 also keeps track of individual MS 1208's locations and security functions and access controls.

A cell broadcast center (CBC) 1240 communicates cell broadcast messages that are typically delivered to multiple users in a specified area. Cell broadcast is one-to-many geographically focused service. It enables messages to be communicated to multiple mobile phone customers who are located within a given part of its network coverage area at the time the message is broadcast.

GGSN 1238 provides a gateway between GPRS network 1202 and a PDN or other external IP networks 1242. That is, GGSN 1238 provides interworking functionality with external networks, and sets up a logical link to MS 1208 through SGSN 1236. When packet-switched data leaves GPRS network 1204, it is transferred to a TCP-IP network 1242, such as an X.25 network or the Internet. In order to access GPRS services, MS 1208 first attaches itself to GPRS network 1204 by performing an attach procedure. MS 1208 then activates a PDP context, thus activating a packet communication session between MS 1208, SGSN 1236, and GGSN 1238.

In a GSM/GPRS network, GPRS services and GSM services can be used in parallel. MS 1208 can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1204 can be designed to operate in three network operation modes (NOM1, NOM2 and NOM3). A network operation mode of GPRS network 1204 is indicated by a parameter in system information messages transmitted within a cell. The system information messages dictates MS 1208 where to listen for paging messages and how to signal towards the network. The network operation mode represents the capabilities of GPRS network 1204. In a NOM1 network, MS 1208 can receive pages from a circuit switched domain (voice call) when engaged in a data call. MS 1208 can suspend the data call or take both simultaneously, depending on the ability of MS 1208 S. In a NOM2 network, MS 1208 may not receive pages from a circuit switched domain when engaged in a data call, since MS 1208 is receiving data and is not listening to a paging channel. In a NOM3 network, MS 1208 can monitor pages for a circuit switched network while receiving data and vice versa.

IP multimedia network 1206 was introduced with 3GPP Release 5, and includes an IP multimedia subsystem (IMS) 1244 to provide rich multimedia services to end users. A representative set of the network entities within IMS 1244 are a call/session control function (CSCF), a media gateway control function (MGCF) 1246, a media gateway (MGW) 1248, and a master subscriber database, called a home subscriber server (HSS) 1250. HSS 1250 may be common to GSM network 1202, GPRS network 1204 as well as IP multimedia network 1206.

IMS 1244 is built around the call/session control function, of which there are three types: an interrogating CSCF (I-CSCF) 1252, a proxy CSCF (P-CSCF) 1254, and a serving CSCF (S-CSCF) 1256. P-CSCF 1254 is the MS 1208's first point of contact with IMS 1244. P-CSCF 1254 forwards session initiation protocol (SIP) messages received from MS 1208 to an SIP server in a home network (and vice versa) of MS 1208. P-CSCF 1254 may also modify an outgoing request according to a set of rules defined by the network operator (for example, address analysis or potential modification).

I-CSCF 1252 forms an entrance to a home network and hides the inner topology of the home network from other networks and provides flexibility for selecting an S-CSCF 1256. I-CSCF 1252 may contact a subscriber location function (SLF) 1258 to determine which HSS 1250 to use for the particular subscriber, if multiple HSSs 1250 are present. S-CSCF 1256 performs the session control services for MS 1208. This includes routing originating sessions to external networks and routing terminating sessions to visited networks. S-CSCF 1256 also decides whether an application server (AS) 1260 is required to receive information on an incoming SIP session request to ensure appropriate service handling. This decision is based on information received from HSS 1250 (or other sources, such as AS 1260). AS 1260 also communicates to a location server 1262 (e.g., a GMLC) that provides a position (e.g., latitude/longitude coordinates) of MS 1208.

HSS 1250 contains a subscriber profile and keeps track of which core network node is currently handling the subscriber. It also supports subscriber authentication and authorization functions. In networks with more than one HSS 1250, SLF 1258 may provide information on the HSS 1250 that contains the profile of a given subscriber.

MGCF 1246 provides interworking functionality between SIP session control signaling from IMS 1244 and ISUP/BICC call control signaling from the external GSTN networks (not shown). It also controls a MGW 1248 that provides user-plane interworking functionality (e.g., converting between AMR- and PCM-coded voice). MGW 1248 also communicates with other IP multimedia networks 1264.

Push to Talk over Cellular (PoC)-capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the predefined area.

Figure 13:
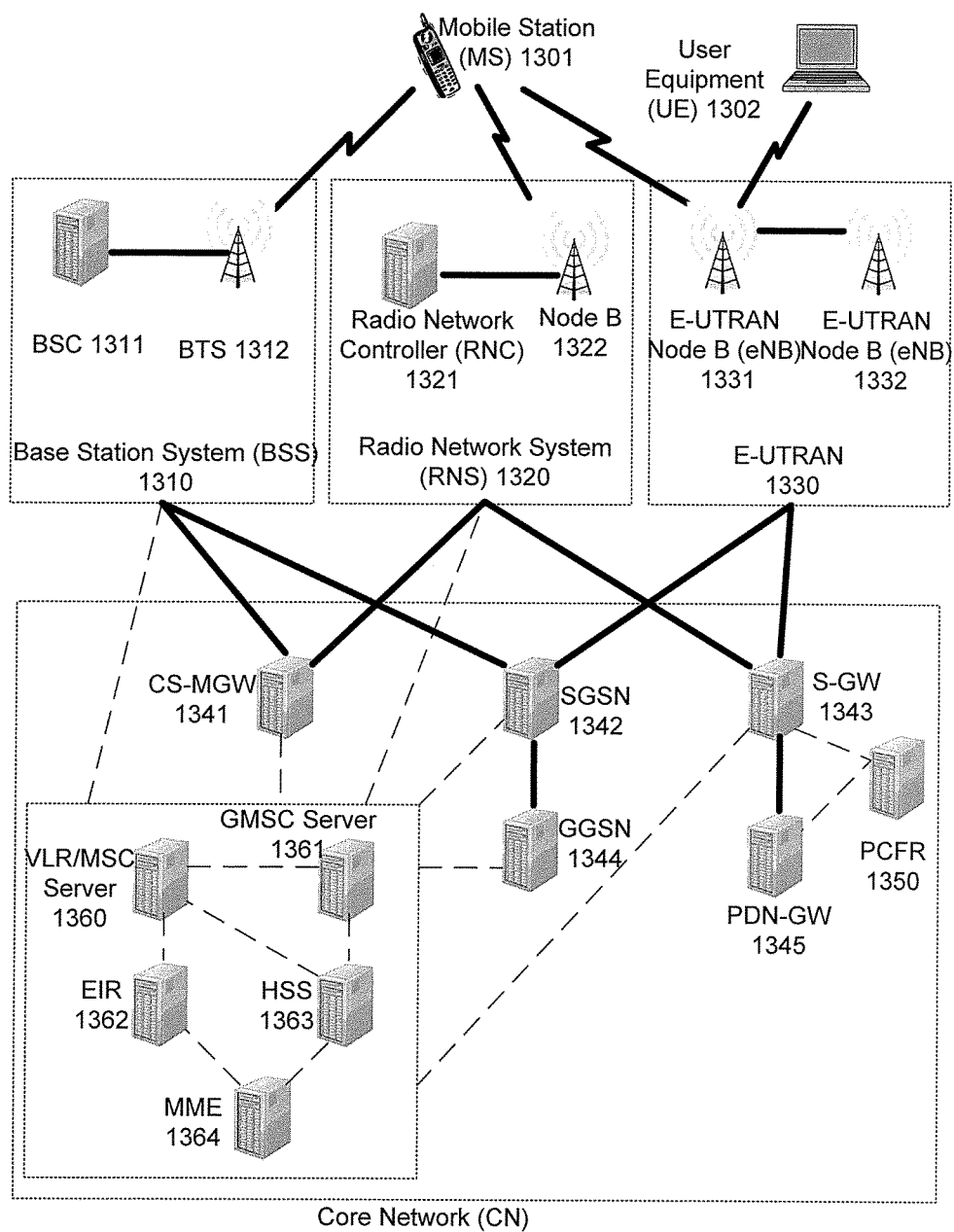
FIG. 13 is a block diagram of an exemplary public land mobile network (PLMN).

FIG. 13 illustrates a PLMN block diagram view of an example architecture that may be replaced by a telecommunications system. MS 1301 is the physical equipment used by the PLMN subscriber. For example, mobile device 102, mobile positioning center 116, network entity 300, any of detected devices 500, second device 508, access device 604, access device 606, access device 608, access device 610 or the like, or any combination thereof may serve as MS 1301. MS 1301 may be one of, but not limited to, a cellular telephone, a cellular telephone in combination with another electronic device or any other wireless mobile communication device.

MS 1301 may communicate wirelessly with BSS 1310. BSS 1310 contains BSC 1311 and a BTS 1312. BSS 1310 may include a single BSC 1311/BTS 1312 pair (base station) or a system of BSC/BTS pairs that are part of a larger network. BSS 1310 is responsible for communicating with MS 1301 and may support one or more cells. BSS 1310 is responsible for handling cellular traffic and signaling between MS 1301 and a core network 1340. Typically, BSS 1310 performs functions that include, but are not limited to, digital conversion of speech channels, allocation of channels to mobile devices, paging, or transmission/reception of cellular signals.

Additionally, MS 1301 may communicate wirelessly with RNS 1320. RNS 1320 contains a Radio Network Controller (RNC) 1321 and one or more Nodes B 1322. RNS 1320 may support one or more cells. RNS 1320 may also include one or more RNC 1321/Node B 1322 pairs or alternatively a single RNC 1321 may manage multiple Nodes B 1322. RNS 1320 is responsible for communicating with MS 1301 in its geographically defined area. RNC 1321 is responsible for controlling Nodes B 1322 that are connected to it and is a control element in a UMTS radio access network. RNC 1321 performs functions such as, but not limited to, load control, packet scheduling, handover control, security functions, or controlling MS 1301 access to core network 1340.

An E-UTRA Network (E-UTRAN) 1330 is a RAN that provides wireless data communications for MS 1301 and user equipment 1302. E-UTRAN 1330 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1330 may include of series of logical network components such as E-UTRAN Node B (eNB) 1331 and E-UTRAN Node B (eNB) 1332. E-UTRAN 1330 may contain one or more eNBs. User equipment 1302 may be any mobile device capable of connecting to E-UTRAN 1330 including, but not limited to, a personal computer, laptop, mobile device, wireless router, or other device capable of wireless connectivity to E-UTRAN 1330. The improved performance of the E-UTRAN 1330 relative to a typical UMTS network allows for increased bandwidth, spectral efficiency, and functionality including, but not limited to, voice, high-speed applications, large data transfer or IPTV, while still allowing for full mobility.

An example of a mobile data and communication service that may be implemented in the PLMN architecture described in FIG. 13 is EDGE. EDGE is an enhancement for GPRS networks that implements an improved signal modulation scheme known as 8-PSK (phase shift keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically MS 1301 may communicate with any or all of BSS 1310, RNS 1320, or E-UTRAN 1330. In a illustrative system, each of BSS 1310, RNS 1320, and E-UTRAN 1330 may provide Mobile Station 1301 with access to core network 1340. Core network 1340 may include of a series of devices that route data and communications between end users. Core network 1340 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1341 is part of core network 1340, and interacts with VLR/MSC server 1360 and GMSC server 1361 in order to facilitate core network 1340 resource control in the CS domain. Functions of CS-MGW 1341 include, but are not limited to, media conversion, bearer control, payload processing or other mobile network processing such as handover or anchoring. CS-MGW 1340 may receive connections to MS 1301 through BSS 1310 or RNS 1320.

SGSN 1342 stores subscriber data regarding MS 1301 in order to facilitate network functionality. SGSN 1442 may store subscription information such as, but not limited to, the IMSI, temporary identities, or PDP addresses. SGSN 1342 may also store location information such as, but not limited to, GGSN 1344 address for each GGSN where an active PDP exists. GGSN 1344 may implement a location register function to store subscriber data it receives from SGSN 1342 such as subscription or location information.

Serving gateway (S-GW) 1343 is an interface which provides connectivity between E-UTRAN 1330 and core network 1340. Functions of S-GW 1343 include, but are not limited to, packet routing, packet forwarding, transport level packet processing, event reporting to Policy and Charging Rules Function (PCRF) 1350, or mobility anchoring for inter-network mobility. PCRF 1350 uses information gathered from S-GW 1343, as well as other sources, to make applicable policy and charging decisions related to data flows, network resources or other network administration functions. PDN gateway (PDN-GW) 1345 may provide user-to-services connectivity functionality including, but not limited to, network-wide mobility anchoring, bearer session anchoring and control, or IP address allocation for PS domain connections.

HSS 1363 is a database for user information and stores subscription data regarding MS 1301 or user equipment 1302 for handling calls or data sessions. Networks may contain one HSS 1363 or more if additional resources are required. Example data stored by HSS 1363 include, but is not limited to, user identification, numbering or addressing information, security information, or location information. HSS 1363 may also provide call or session establishment procedures in both the PS and CS domains.

VLR/MSC Server 1360 provides user location functionality. When MS 1301 enters a new network location, it begins a registration procedure. A MSC server for that location transfers the location information to the VLR for the area. A VLR and MSC server may be located in the same computing environment, as is shown by VLR/MSC server 1360, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1301 registration or procedures for handover of MS 1301 to a different section of core network 1340. GMSC server 1361 may serve as a connection to alternate GMSC servers for other MSs in larger networks.

EIR 1362 is a logical element which may store the IMEI for MS 1301. User equipment may be classified as either "white listed" or "black listed" depending on its status in the network. If MS 1301 is stolen and put to use by an unauthorized user, it may be registered as "black listed" in EIR 1362, preventing its use on the network. A MME 1364 is a control node which may track MS 1301 or user equipment 1302 if the devices are idle. Additional functionality may include the ability of MME 1364 to contact idle MS 1301 or user equipment 1302 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which the location of the origination of e911 calls may be determined have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and apparatuses may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an apparatus for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may combined with hardware implementations.

The methods and apparatuses associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing telecommunications as described herein. When implemented on a general-purpose processor, the program code combines with the processor to provide a unique apparatus that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

What is claimed:

1. A method comprising:
   determining, by a mobile positioning center, that an emergency call has been made by a mobile device having a wireless radio, wherein the mobile positioning center is communicatively coupled to a location database and a recipient of the emergency call;
   determining that the mobile device has not provided a location of the mobile device to the recipient of the emergency call;

receiving, from the mobile device, an identifier of a first device detected by the wireless radio;
determining that the first device is not fixed;
sending, by the mobile positioning center, a first location request to the first device to determine a first location of the first device;
determining that the first device is unable to determine the first location based upon a GPS signal;
receiving, at the mobile positioning center, from the first device, a second identifier of a second device detected by the first device;
if the second device is not fixed, sending a second location request to the second device to determine a second location of the second device; and
determining the first location of the first device based upon the second location;
determining the location of the mobile device based upon the first location; and
providing, by the mobile positioning center, the location of the mobile device to the recipient of the emergency call.

2. The method of claim 1, wherein the first device is one of a plurality of detected devices and further comprising:
for each of the plurality of detected devices, receiving, at the mobile positioning center, from the mobile device, an additional identifier; and
sending, by the mobile positioning center, an additional location request to each of the plurality of detected devices that is not fixed to determine an additional location,
wherein determining the location of the mobile device is further based upon the additional location.

3. The method of claim 2, further comprising:
determining an accuracy of the location of the mobile device based upon at least one of a number of the plurality of detected devices, a type of the wireless radio used to detect the plurality of detected devices, and a signal strength associated with each of the plurality of detected devices; and
providing the accuracy of the location of the mobile device to the recipient.

4. The method of claim 2, wherein determining the location of the mobile device further includes identifying a centroid of the plurality of detected devices as the location of the mobile device.

5. The method of claim 1, wherein determining the location of the mobile device includes identifying the first location as the location of the mobile device.

6. The method of claim 1, wherein the first device is at least one of a beacon and a wireless access point.

7. The method of claim 1, further comprising:
causing the mobile device to enable a wireless radio.

8. The method of claim 1, wherein the first device provides the first location to the mobile positioning center.

9. The method of claim 1, wherein the mobile device is one of a vehicle or a smart appliance.

10. An apparatus comprising:
a processor; and
memory coupled to the processor, the memory storing a location database and executable instructions that cause the processor to effectuate operations comprising:
determining that an emergency call has been made by a mobile device having a wireless radio;
determining that the mobile device has not provided a location of the mobile device to a recipient of the emergency call;
receiving, from the mobile device, an identifier of a first device detected by the wireless radio;
determining that the first device is not fixed;
sending a first location request to the first device to determine a first location of the first device;
determining that the first device is unable to determine the first location;
receiving, from the first device, a second identifier of a second device detected by the first device;
if the second device is not fixed, sending a second location request to the second device to determine a second location of the second device; and
determining the first location of the first device based upon the second location;
determining the location of the mobile device based upon the first location; and
providing the location of the mobile device to a recipient of the emergency call,
wherein the apparatus does not comprise the mobile device.

11. A method comprising:
determining, by a mobile positioning center, that a mobile device located in a sector has made an emergency call, wherein the mobile positioning center is communicatively coupled with a location database and a recipient of the emergency call;
identifying, by the mobile positioning center, a first device located in the sector;
sending, by the mobile positioning center to the first device a command to determine whether the first device can detect the mobile device;
receiving, by the mobile positioning center, from the first device, an indication that the first device detects the mobile device;
determining, by the mobile positioning center, that the first device cannot provide a first location associated with the first device;
receiving, at the mobile positioning center, a second identifier of a second device detected by the first device;
receiving, by the mobile positioning center, a second location of the second device; and
determining, by the mobile positioning center, the first location of the first device based upon the second location;
determining, by the mobile positioning center, a location of the mobile device based upon the first location; and
providing the location of the mobile device to the recipient of the emergency call,
wherein if the first device is fixed, determining the first location includes querying the location database and if the first device is not fixed, determining the first location includes sending a first location request to the first device.

12. The method of claim 11, further comprising:
identifying all of a plurality of devices located in the sector,
wherein the sending further includes sending the command to each of the plurality of devices.

13. The method of claim 11, wherein the command includes an identifier of the mobile device.

14. The method of claim 11, wherein the first device is one of a plurality of devices that detect the mobile device, the method further comprising:
receiving an indicator from an additional device of an additional location of the additional device, wherein the additional device is one of the plurality of devices and determining the location of the mobile device is further based upon the additional location.

15. The method of claim 14, further comprising:
determining an accuracy of the location of the mobile device based upon at least one of a number of the plurality of devices, a type of a wireless radio associated with the first device that was used to detect the mobile device, and a signal strength associated with each of the plurality of devices; and
providing the accuracy of the location of the mobile device to the recipient.

16. The method of claim 15, wherein the type of wireless radio is at least one of a Bluetooth® and a Wi-Fi radio.

17. The method of claim 12, wherein determining the sector further includes determining a second sector in which the mobile device is located and wherein the sending further includes sending the command to each of the plurality of devices that are located in both the sector and the second sector.

18. The method of claim 11, wherein determining the sector further includes determining a second sector in which the mobile device is located and wherein the sending further includes sending the command to each device that is located in any of the sector and the second sector.

19. The method of claim 11, wherein determining the location of the mobile device includes identifying the first location as the location of the mobile device.

* * * * *